United States Patent
Yaguchi

(10) Patent No.: US 7,551,885 B2
(45) Date of Patent: Jun. 23, 2009

(54) IMAGE PROCESSING APPARATUS

(75) Inventor: Minoru Yaguchi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 398 days.

(21) Appl. No.: 11/337,240

(22) Filed: Jan. 20, 2006

(65) Prior Publication Data
US 2007/0058994 A1   Mar. 15, 2007

(30) Foreign Application Priority Data
Sep. 14, 2005   (JP) ............................. 2005-267466

(51) Int. Cl.
*G03G 15/00* (2006.01)
*B65H 7/12* (2006.01)
*H04N 1/00* (2006.01)
(52) U.S. Cl. ................... 399/368; 399/361; 399/365; 399/367; 358/1.17; 358/474; 358/498
(58) Field of Classification Search ............. 399/9, 399/16–20, 361, 363, 365, 367, 368, 369; 358/1.17, 474, 496, 498
See application file for complete search history.

(56) References Cited

U.S. PATENT DOCUMENTS 7,072,595 B2 * 7/2006 Joichi et al. .................. 399/45

FOREIGN PATENT DOCUMENTS

| JP | 02-075454 U | | 6/1990 |
|---|---|---|---|
| JP | 04315358 A | * | 11/1992 |
| JP | 07-315634 | | 12/1995 |
| JP | 2002196626 A | * | 7/2002 |
| JP | 2004023427 A | * | 1/2004 |
| JP | 2005-067871 A | | 3/2005 |
| JP | 2005067871 A | * | 3/2005 |
| JP | 2005173472 A | * | 6/2005 |
| JP | 2006-213504 A | | 8/2006 |

OTHER PUBLICATIONS

Japanese Office Action (and English translation thereof) dated May 22, 2008, issued in a counterpart Japanese Application.

* cited by examiner

*Primary Examiner*—Jill E Culler
*Assistant Examiner*—'Wyn' Q Ha
(74) *Attorney, Agent, or Firm*—Frishauf, Holtz, Goodman & Chick, P.C.

(57) ABSTRACT

The present invention provides an image processing apparatus which not only judges the occurrence of multiple feeding with a high accuracy, but also can identify later the location of occurrence of the multiple feeding even if the document reading operation is continued after detecting the occurrence of a multiple feeding. The detection device (the detecting and reading section 53) detects the information storage media attached to the documents which are being fed one sheet at a time by the automatic document feeder 20 and from which the images are being read out. The determining section 56 detects based on the result of this detection the occurrence of multiple feeding in which a plural number of sheets of the document are conveyed in an overlapping state. The information recording section 54 writes the multiple feeding information, indicating that a multiple feeding has occurred, in the information recording medium of the document that was judged to have been fed in an overlapping state.

17 Claims, 17 Drawing Sheets

CONVEYING DIRECTION

CONVEYING DIRECTION

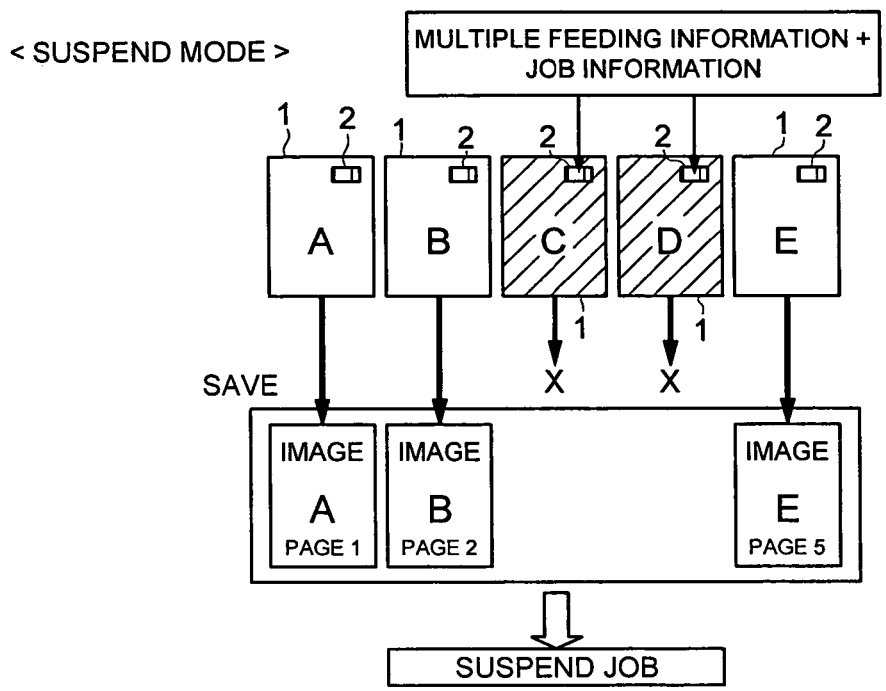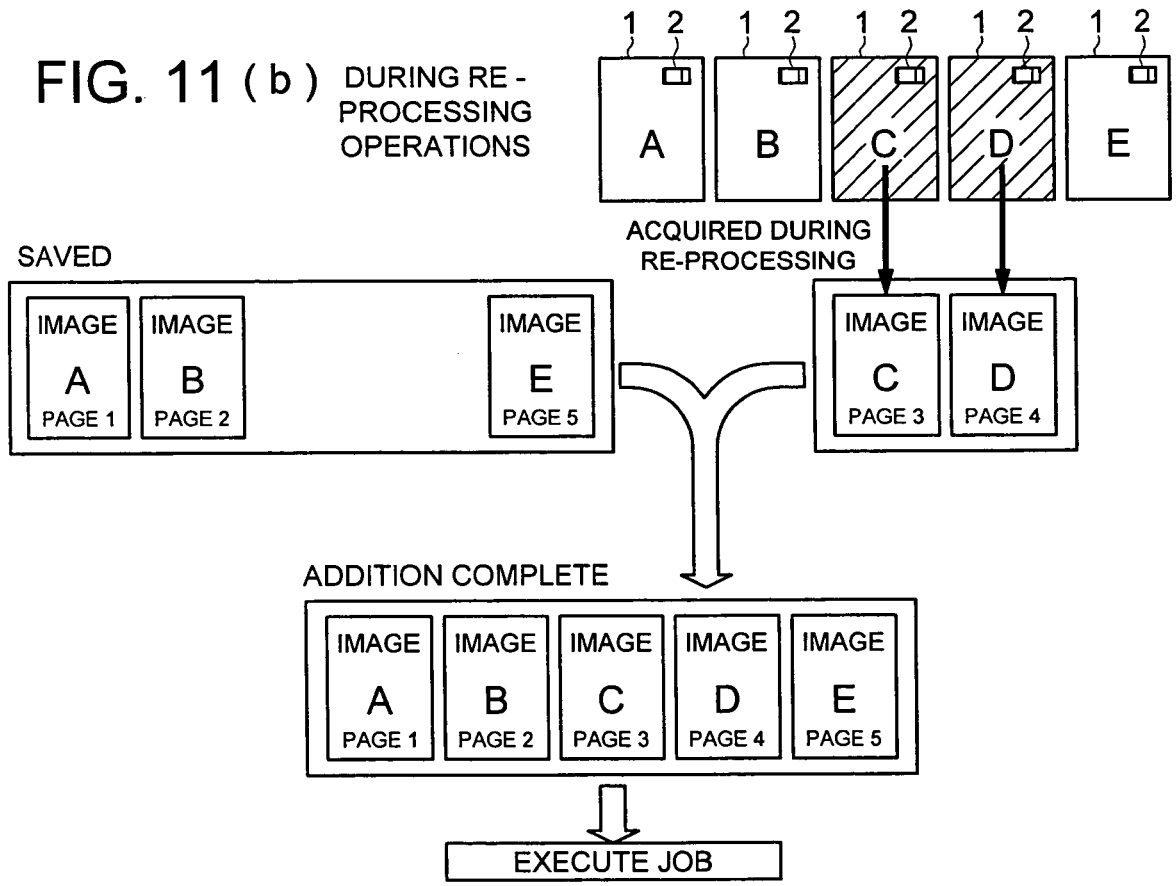

FIG. 12 (a) WHEN A MULTIPLE FEEDING OCCURS
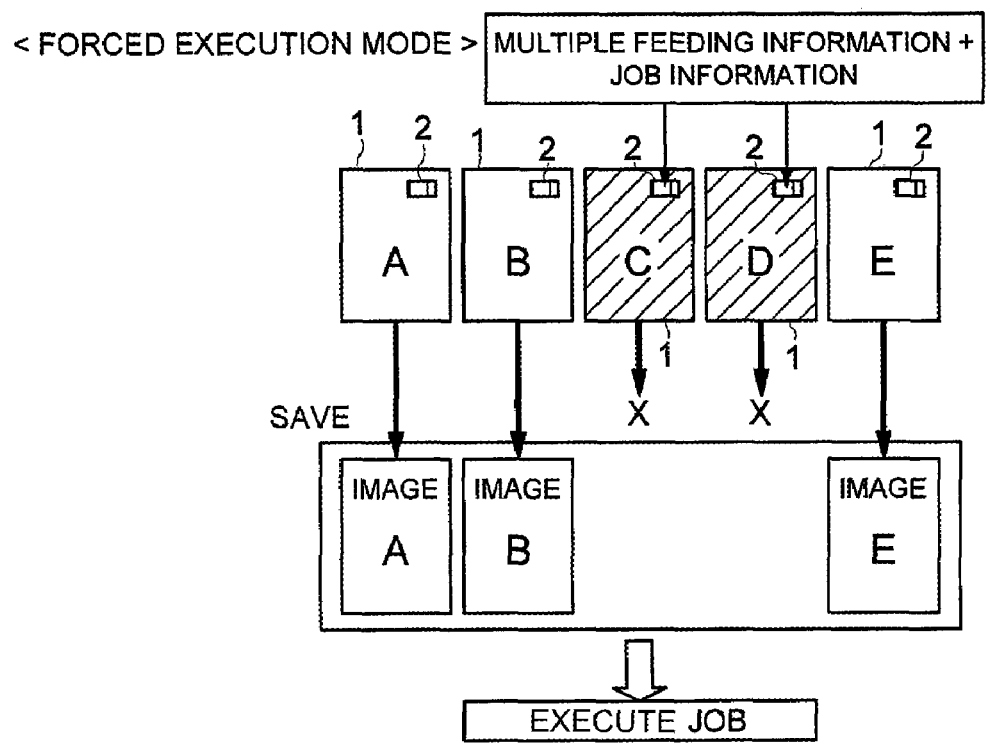
FIG. 12 (b) DURING RE-PROCESSING OPERATIONS
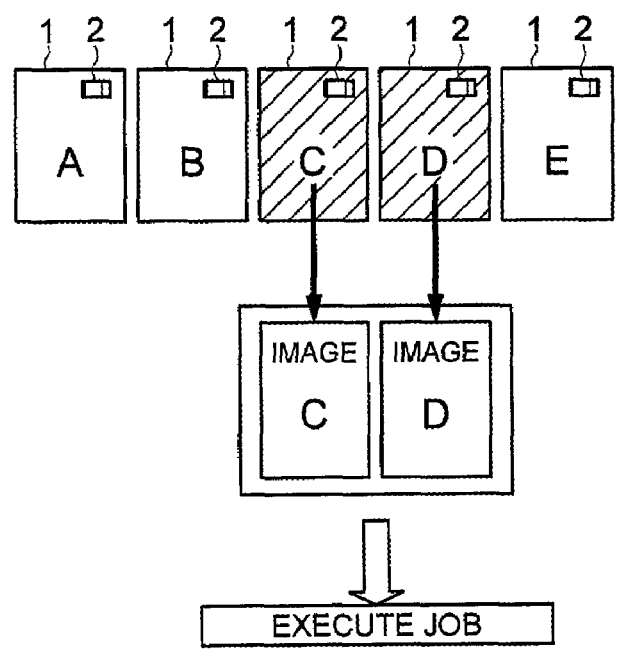

IMAGE PROCESSING APPARATUS

RELATED APPLICATION

This application is based on Japanese Patent Application No. 2005-267466 filed on Sep. 14, 2005, in Japanese Patent Office, the entire content of which is hereby incorporated by reference.

BACKGROUND

1. Technical Field

The present invention relates to image processing apparatus having an automatic document feeder.

2. Description of the Related Art

In an image processing apparatus that carries out transmission or printing of images read out from an original document, very often an automatic document feeder is installed which issues document sheets one sheet at a time from a stack of document sheets placed on the document loading tray and conveys them to the document reading position. In such image processing apparatuses, since there is no need for the user to place each sheet of the document manually at the reading position, it is possible to complete the reading of the stack of document sheets automatically even if the user is not present near the apparatus.

However, when the automatic document feeder feeds document sheets one sheet at a time from a stack of document sheets placed on the document loading tray, because of the friction force acting between document sheets, sometimes multiple feeding is made with a plurality of document sheets being conveyed simultaneously. When multiple feeding occurs, it is possible to read only the image of the document sheet that is facing the reading surface and the image of the other document sheets being transported simultaneously will be missing.

In addition, even when multiple feeding occurs, if the document conveying is continued as such until all the sheets in the document sheet stack on the loading tray have been exhausted, the user may not become aware that the read out document is not complete, or even if the user becomes aware, it was a very tedious work to confirm which are the sheets whose images are missing.

In view of this, a technology has been proposed of detecting the occurrence of multiple feeding by measuring the intensity of light passing through the document or by measuring the force of the document acting on the conveyor belt of the automatic document feeder, stopping the conveying of document sheets at the point of time when the multiple feeding occurred so that it is possible to identify the page of the document at which the multiple feeding occurred, and posting this information to the user (see, for example, Patent Document 1).

Patent Document 1: Japanese Unexamined Patent Application Open to Public Inspection No. 7-315634

In the methods of detected multiple feeding by measuring the amount of transmitted light or by measuring the pressure acting on the conveyor belt, since only the occurrence of multiple feeding is detected, in order for the user to recognize at which page did the multiple feeding occurred, it is unavoidable to stop conveying the document at the instant when the multiple feeding occurred.

However, if the conveying of document is stopped at the instant when a multiple feeding occurred, there were that problems that, if the user requesting that job is not present in the vicinity of the apparatus or is in a condition in which the user cannot receive the message indicating multiple feeding, the automatic document feeder would remain unattended in the stopped condition thereby causing inconvenience to the other users waiting to use the apparatus.

In addition, in the method of detecting the occurrence of multiple feeding by measuring the amount of transmitted light or by measuring the pressure acting on the conveyor belt, there may be the possibility of erroneous detection due to changes in the paper quality of the document.

SUMMARY

A purpose of the present invention is to provide an automatic document feeder that can detect the occurrence of multiple feeding. In addition, another purpose of the present invention is to provide an image processing apparatus in which it is possible to identify the document (page position) at which the multiple feeding occurred. Furthermore, yet another purpose of the present invention is to provide an image processing apparatus in which, even when the document reading operation is continued as it is after detecting the occurrence of a multiple feeding, it is possible to identify the location of occurrence of multiple feeding later.

In view of foregoing, an object of this invention is to solve at least one of the problems, and to provide new apparatus. The apparatus comprises an image reading section which reads an image on an original document at a reading position and obtains image data corresponding to the image;

an original document conveying section which conveys the original document to the reading position by feeding the original document separately from a bunch of a plurality of the original documents;

a detecting section which detects an information recording medium on the original document being conveyed by the original document conveying section; and a determining section which determines existence or non-existence of multiple feeding, where a plurality of original documents are conveyed in an overlapping state, based on a detection result of the detecting section.

The invention itself, together with further objects and attendant advantages, will best be understood by reference to the following detailed description taken in conjunction with the accompanying drawings.

BRIEF DESCRIPTION OF THE DRAWINGS

FIG. 11(a) is an explanatory diagram showing the contents of processing for the document and its images during the suspend mode.

FIG. 11(b) is an explanatory diagram showing the contents of processing for the document and its images during the suspend mode.

FIG. 12(a) is an explanatory diagram showing the contents of processing for the document and its images during the forced execution mode.

FIG. 12(b) is an explanatory diagram showing the contents of processing for the document and its images during the forced execution mode.

In the following description, like parts are designated by like reference numbers throughout the several drawings.

DETAILED DESCRIPTION OF THE PREFERRED EMBODIMENT

A preferred embodiment of the present invention is explained in the following with reference to the drawings.

The image processing apparatus according to a preferred embodiment of the present invention is an apparatus called a multi function peripheral that is provided with the function of reading images of original documents and carrying out various types of image processing operations. The image processing apparatus is provided with an automatic document feeder as an original document conveying section that automatically conveys the document sheets to the reading position, and this automatic document feeder is provided with the function of judging the occurrence of multiple feeding in which a plurality of document sheets are conveyed in an overlapped state, and carrying out recovery by identifying the location (the page position) of its occurrence.

Figure 1:
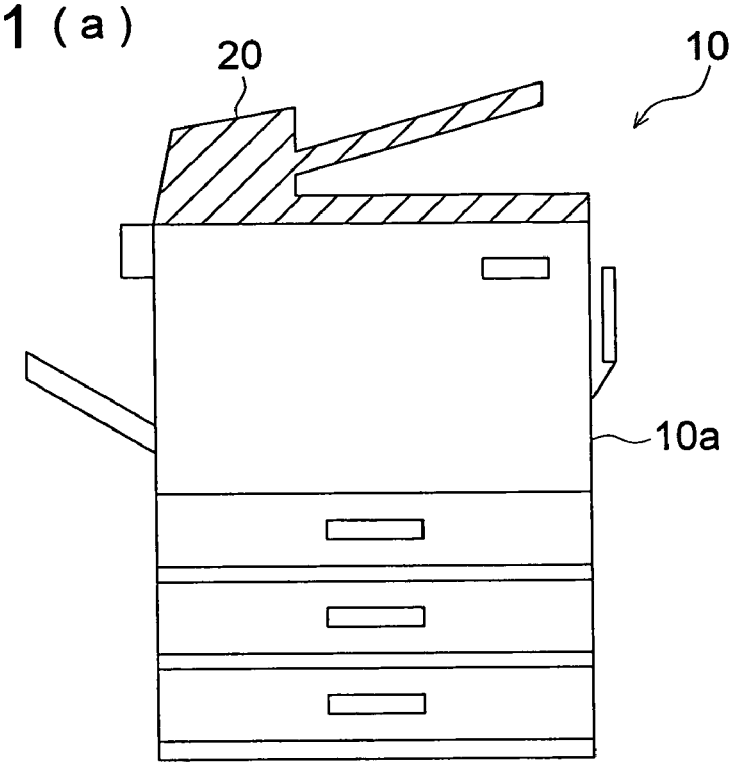
FIG. 1(a) is a configuration diagram of an automatic document feeder according to a preferred embodiment of the present invention.
FIG. 1(b) is another configuration diagram of the automatic document feeder according to a preferred embodiment of the present invention.
Figure 1:
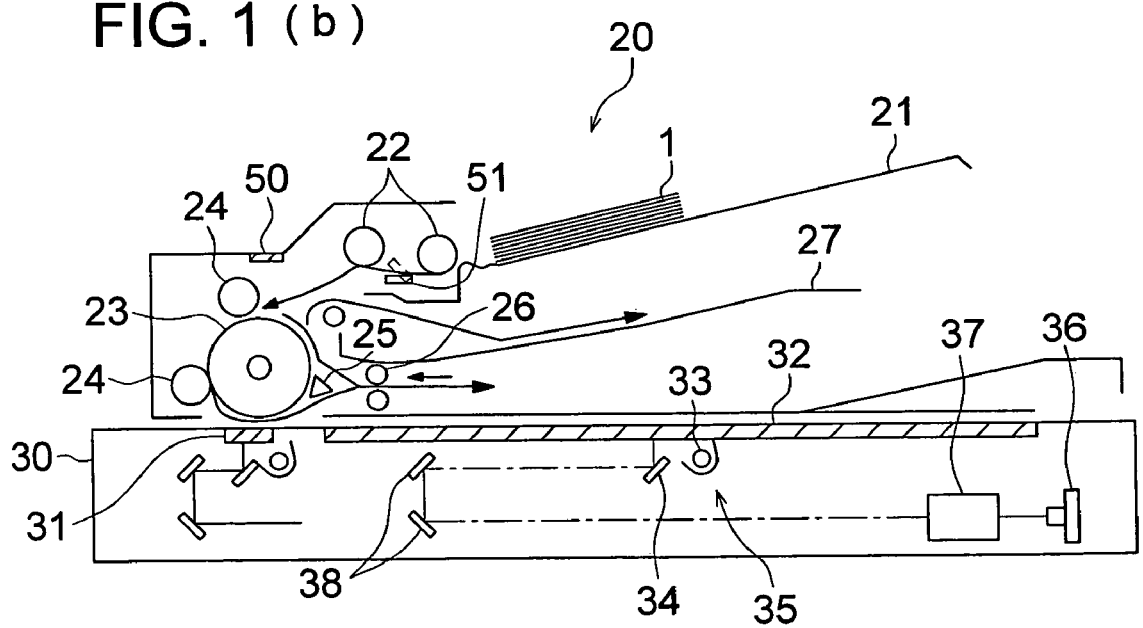

FIG. 1 is a configuration diagram of an automatic document feeder 20 according to a preferred embodiment of the present invention.

FIG. 1(a) shows an outline diagram of the external appearance of an image processing apparatus 10. The automatic document feeder 20 shown by the hatched part in the figure is installed so as to cover the document reading surface which is the top surface of the main unit 10a of the image processing apparatus 10.

FIG. 1(b) shows a cross-sectional diagram for explaining the outline configuration of the automatic document feeder 20 and the image reading section 30 that reads the document.

The automatic document feeder 20 is provided with document feed rollers 22 that feed one sheet at a time of the document taking them from the top of a stack with a plurality of document sheets, a contact roller 23 that causes the document 1 to pass over and in close contact with a contact glass 31 which becomes the document reading position, and a guide roller 24 that guides the document 1 issued by the document feed rollers 22 along the contact roller 23. In addition, a selection tab 25 that changes the direction of movement of the document 1 that has passed over the contact glass 31, reversing rollers 26 for turning upside down the top and bottom surfaces of a double-sided document, and a discharge tray 27 to which the document 1 whose reading has been completed is discharged are also provided in this apparatus.

When the document 1 that is conveyed is a double-sided document, after it has passed over the contact glass 31 being conveyed by the contact roller 23, it is guided by the selection tab 25 to pass between a pair of reversing rollers 26. Just before the rear edge of the document 1 reaches the reversing rollers 26, the direction of rotation of the reversing rollers 26 is reversed, and also the position of the selection tab 25 is change, and this time the document 1 is sent towards the top side of the contact roller 23. Because of this, the document 1 is turned upside down.

The document 1 that is conveyed to the contact roller 23 and has passed again over the contact glass 31 is again turned upside down, guided by the selection tab 25 towards the discharge tray 27 and is discharged. When the document 1 is a single-sided document, the document 1 issued form the loading tray 21 is passed over the contact glass 31 along the contact roller 23, and is then guided towards the discharge tray 27 and is discharged.

The image reading section 30 is provided on its top surface with a slit-shaped contact glass 31 that becomes the reading position of the document 1 fed by the automatic document feeder 20, and a platen glass 32 that becomes the reading position of the document 1 placed by the user it. Below the contact glass 31 and the platen glass 32 is provided an exposure scanning section 35 that comprises a light source 33 and a mirror 34. The exposure scanning section 35 is configured so that it can be moved along the lower surface of the platen glass 32 by a drive section not shown in the figure. The light source 33 illuminates the document 1 through the contact glass 31 or through the platen glass 32, and the mirror 34 receives the light reflected from the document 1 and has the function of making its path or progression roughly parallel to the platen glass 32.

Further, the image reading section 30 comprises a line image sensor 36 that receives the light reflected from the document 1 and outputs an analog video signal corresponding to the intensity of that light, a focusing lens 37 that focuses the light reflected from the document 1 on to the line image sensor 36, and various types of mirrors 38 that for the optical path for guiding the reflected light from the mirror 34 of the exposure scanning section 35 to the line image sensor 36. The line image sensor 36 has the function of scanning the document 1 in the main scanning direction, and is configured using, for example, a plurality of CCD (Charge Coupled Device) devices.

When the automatic document feeder 20 is used, the document is read in the transporting read method. In the transporting read method, the image of the document 1 is read, in the state in which the exposure scanning section is kept stopped immediately below the contact glass 31, by carrying out relative movement of the document in the auxiliary scanning direction by moving the document 1 so that it passes over the contact glass 31. The front edge (the left edge in FIG. 1(b)) of the document 1 placed in the loading tray 21 of the automatic document feeder 20 with its top surface facing up is taken in to the document feeding rollers 22, and is passed over the document reading position above the contact glass 31 after reversed feeding along the contact roller 23.

In this manner, the image reading section takes the contact glass 31 as the reading position of the document 1 when the automatic document feeder 20 is used. Further, the platen glass 32 becomes the reading position when the user manually places the document 1 on it. Therefore, the reading position is the contact glass 31 in the present preferred embodiment in which the automatic document feeder 20 judges the occurrence of multiple feeding in which several sheets of the document 1 are fed together in an overlapping state.

The automatic document feeder 20 is further provided with an antenna 50 and a document sensor 51.

The antenna 50 has the function of carrying out wireless communication with a very small RFID (Radio Frequency Identification) tag that is attached to the document 1 as an information recording medium.

Here, RFID is a scheme for identifying and managing physical items using a very small wireless chip (RFID tag). In concrete terms, an RFID tag capable of storing information is attached to the physical item that is the target of identification and management. The identification and management of the physical items to which RFID tags are attached are carried out based on the information read out or written into this RFID tag by wireless communication between it and the antenna 50. In the present preferred embodiment, the document 1 which is the target of image read out is managed using the RFID tag attached to each sheet of the document 1.

The antenna 50 is placed at a predetermined position within the transport path of conveying the document 1 one sheet at a time within the automatic document feeder 20. The communication area of the antenna 50 has been set so that the RFID tags of the sheets of document 1 in the loading tray 21 or in the discharge tray 27 are not detected but only the RFID tag attached to the document 1 being conveyed is detected.

The document sensor 51 carries out the function of detecting when the front edge or the rear edge of the document 1 being conveyed passes over a specific position within the automatic document feeder 20. The document sensor 51 is configured, for example, by a lever, above the top conveying surface over which the document 1 is conveyed within the automatic document feeder 20, that can be pushed down and that is projecting above in a diagonal direction towards the direction of document convey, and a switch not shown in the figure that becomes ON when this lever is depressed to below the document conveying surface.

When the front edge of the document 1 being conveyed in the automatic document feeder 20 reaches the lever of the document sensor 51, the lever gets gradually depressed due to the pushing pressure of the document 1, and the switch becomes ON when this lever goes below the conveying surface. Because of this, it is possible to detect that the front edge of the document 1 being conveyed has arrived at the position of the document sensor 51.

When the document 1 is conveyed further in that condition and the rear edge of the document 1 has gone beyond the lever of the document sensor 51, the lever gets released from the pushing force of the document 1 thereby returning to its original state, and the switch becomes OFF again. Because of this, it is possible to detect the rear edge of the document 1 being conveyed has passed beyond the position of the document sensor 51.

Next, the functions possessed by the image processing apparatus 10 are explained below.

The image processing apparatus 10 according to the present preferred embodiment is configured as a multi function peripheral having various types of image processing functions such as the facsimile function of transmitting and receiving image data via public switched telephone network lines, the copier function of reading out documents and forming their copy images on recording sheets, the scanning function of outputting to external devices the read out image data, the printer function printing based on the received print data, etc.

In the image processing apparatus 10, the work executed is in units of a job, and jobs can be transmission jobs or reception jobs using the facsimile function, copy jobs using the copying function, scan jobs using the scanning function, or print jobs using the printing function. For example, when a work of "reading automatically a stack of documents using the automatic document feeder, and transmitting this image data via public switched telephone network lines to a destination indicated by a telephone number received from the user" is instructed as a transmission job, this sequence of operations is handled as a single job.

For each job the operating conditions are stipulated by various types of setting items such as the number of copies to be transmitted or the number of copies to be printed, the resolution, enlargement or reduction ratio, etc. The standard values of these operating conditions are registered beforehand. as the default job information. The user can enter the necessary information such as the telephone number, etc., at the time of inputting the job, or can execute a job with operation conditions matching the desired needs of the user by appropriately changing the default job information.

Figure 2:
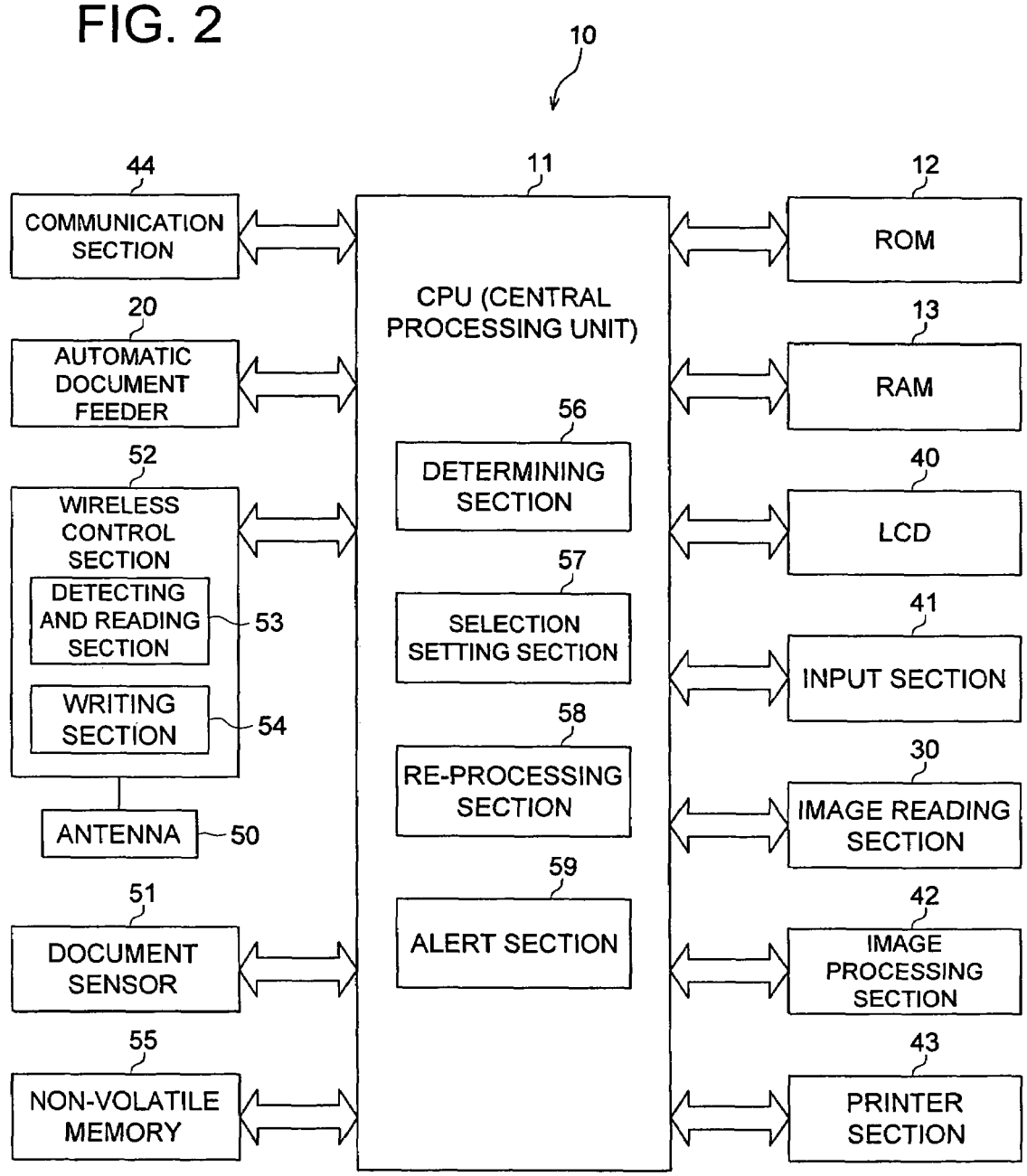
FIG. 2 is a block diagram showing the electrical configuration of an image processing apparatus according to the first preferred embodiment of the present invention.

FIG. 2 is a block diagram showing the electrical configuration of an image processing apparatus 10 according to the first preferred embodiment of the present invention.

The image processing apparatus 10 includes a CPU (Central Processing Unit) 11 as a control section that comprehensively controls the operation of this apparatus, a ROM (Read Only Memory) 12, and a RAM (Random Access Memory) 13 as the main constituent circuits.

ROM 12 stores the programs executed by the CPU 11 and various types of fixed data. The RAM 13 functions as a working storage for temporarily storing various types of data at the time of program execution by the CPU 11, and functions as a page memory that temporarily stores at least one page of image data for carrying out rotation operation etc.

Further, an LCD (Liquid Crystal Display) 40, an input section 41, an image reading section 30, an image processing section 42, a printer section 43, a communication section 44, an automatic document feeder 20, a wireless control section 52, a document sensor 51, and a non-volatile memory 55 as the image data storing section are connected to the CPU 11.

The LCD 40 is a liquid crystal display carrying out the function of making various types of guidance displays and status displays to the user.

The input section 41 is configured using various types of switches and a touch panel covering the surface of the LCD 40, and has the function of receiving various types of operations from the user.

The analog video signal output from the line image sensor 36 of the image reading section 30 is A/D (Analog/Digital) converted and is read in as a digital image data by the CPU 11.

The image processing section 42 carries out the functions of enlarging or reducing the image data, rotating the image, etc.

The printer section 43 carries out the function forming images corresponding to the image data on a recording sheet using the electro-photographic method and giving print outputs. The printer section 43 is configured as a so-called laser printer that comprises a recording sheet conveying unit, photoreceptor drums, charging units, laser units, a developing unit, a transferring and separating unit, a cleaning unit, and a fixing unit.

The communication section 44 has the function of carrying out transmission and reception of image data due to the facsimile function or of carrying out transmission and reception of various types of data with a PC (Personal Computer). In the case of transmission or reception of image data due to the facsimile function, this section carries out the function of exchanging various types of control signals and image data with the destination terminal via public switched telephone network lines. Such data communication is carried out based on the transmission control procedure of G3 (Group 3) facsimile stipulated by the communication rules in the recommendations T.30 of ITU-T (International Telecommunication Union Telecommunication Standardization Sector). When carrying out transmission and reception of various types of data with a PC, the function of data communication is carried out via the network using email function etc.

The conveying of the document 1 by the automatic document feeder 20 is carried out based on the instructions from the CPU 11. The antenna 50 shown in FIG. 1 is connected to the wireless control section 52. The wireless control section 52 has the functions of carrying out transmission and reception of information via the antenna 50 with the RFID tag attached to the document 1 being conveyed, and of controls necessary for supplying power to the RFID tag by means of non-contacting power transmission.

When carrying out transmission and reception of information with the RFID tag, the wireless control section 52 carries out the function of a detecting and reading section 53 and an information recording section 54. The detecting and reading section 53 carries out the function of a detecting section that detects whether or not an RFID tag is attached to the document 1 being conveyed in the automatic document feeder 20, and the function of an information obtaining section that reads out the information stored in the RFID tag. Further, the information recording section 54 has the function of acquiring information from the CPU 11 and writing that information in the RFID tag attached to the document 1 being conveyed.

The signal indicating that the document sensor 51 has detected the front edge or the rear of the document 1 is being input to the CPU 11.

The non-volatile memory 55 is a re-writable memory that retains the storage contents even when the power supply is switched OFF. The non-volatile memory 55 is configured using semiconductor memory or an HDD (Hard Disc Drive). The non-volatile memory 55 carries out the function of storing the image data or the job information related to different jobs.

The CPU 11 further has functions of a determining section 56, a selection setting section 57, a re-processing section 58, and an alert section 59.

The determining section 56 carries out the functions of judging whether or not multiple feeding has occurred which is the feeding of several sheets of document 1 in an overlapping state in the automatic document feeder 20, and of providing to the information recording section 54 the information necessary for recovering from a multiple feeding. The presence or absence of a multiple feeding is judged based on the result of detection of the RFID tags attached to the document 1 by the detecting and reading section 53.

The information necessary for recovering from a multiple feeding can be the multiple feeding information indicating that the document was conveyed in an overlapping state, and the job information indicating the contents of the job carried out on that document.

The job for the document 1 that has been conveyed in an overlapping state has its contents stipulated depending on a variety of job information. Among these, the job information provided by the determining section 56 is the type information and the destination information. The type information is the information indicating the type of the job. The destination information is the information indicating the telephone number of the facsimile unit of the destination for a transmission job.

The job information provided from the determining section 56 consists only of the type information when the being executed is a copy job, a scan job, or a print job. In the case of a transmission job, it is configured using both the type information and the destination information.

Further, the type of transmission job need not be limited to the facsimile function given in the example here. For example, it is possible to transmit image data via the network using the IP (Internet Protocol) facsimile function, the internet facsimile function, or the scan-to-email function. In this case, the IP telephone number or mail address corresponding to the respective function becomes the destination information. In addition, it is also possible to take the destination name as the destination information. If the telephone number, etc., is stored while establishing correspondence with the destination name, it is possible to execute the transmission job based on this information.

The selection setting section 57 carries out the function of selecting the mode as to which type of operation is to be made for the job, when it is judged that a multiple feeding has occurred during the execution of that job. Mode selection is carried out based on an instruction from the user given via a touch panel, not shown in the figure, but displayed in the LCD 40.

The modes that can be selected are the suspend mode and the force execution mode. The suspend mode is one in which, when it is judged that a multiple feeding has occurred, continuing the reading of images of other sheets of document 1 that were not judged to have been fed in an overlapping state, saving the read out image data in the non-volatile memory 55, and then temporarily terminating the job being executed, and suspending the execution of the remaining operations related to that job.

The forced execution mode is the mode in which, when a multiple feeding is judged to have occurred, the image reading is continued for all other sheets of the document 1 that were judged not to have been fed in an overlapping state, and the job under execution is continued and completed only for the images read out.

The re-processing section 58 has the functions of carrying out controls related to the operations at the time of reading again the document 1 that had been conveyed in an overlapping state previously (hereinafter referred to as re-processing operations). The re-processing operations include the operations of distinctly identifying the document 1 that had been conveyed in an overlapping state previously from the stack of document sheets and reading out images from them (hereinafter referred to as re-reading operations), and the operations of executing the job using the read out images (hereinafter referred to as re-execution operations).

In detail, the re-reading operations comprise the operation of conveying the stack of document sheets placed again on the loading tray 21 one sheet at a time, the operation of reading out information in the RFID tag attached to the document 1 being conveyed, and the operation of reading out images from the document 1 from which multiple feeding information has been read out. The documents for which the multiple feeding information has not been stored are merely conveyed and it is not necessary to read images from them.

The details of the re-execution operations differ depending on the mode that had been set at the time of occurrence of multiple feeding. In the case of the suspend mode, the re-execution operations include the operation of adding the images read during the re-reading operations as the images of the suspended job to that job, and the operation of executing the remaining processing of the suspended job. Addition of images is carried out by establishing correspondence of the image data read during the re-reading operations to the same job as the job to which the image data stored in the non-volatile memory belong.

In the case of the forced execution mode, for the sheets of the document 1 that were not conveyed in an overlapping state, the images are read out and the job is completed as it is. Here, the re-execution operations comprise carrying out the same processing for the documents fed in an overlapping state as the processing executed for the images read out from the document 1 that were not fed in an overlapping state in that completed job, that is, for the images read during the re-reading operations.

The alert section 59 carries out the function of issuing a warning when a multiple feeding is judged to have occurred during the execution of a job. The warning is issued by making a warning display in the LCD 40 of the image processing apparatus 10 or by transmitting the warning message through a predetermined terminal using the email function of the communication section 44. When using the email function, the warning is transmitted to the user identified during user authentication using an email address that has been registered beforehand. Apart from this, it is also possible to give out the warning by sound or by lighting up an LED (Light Emitting Diode) lamp and is not limited to any predetermined method.

Figure 3:
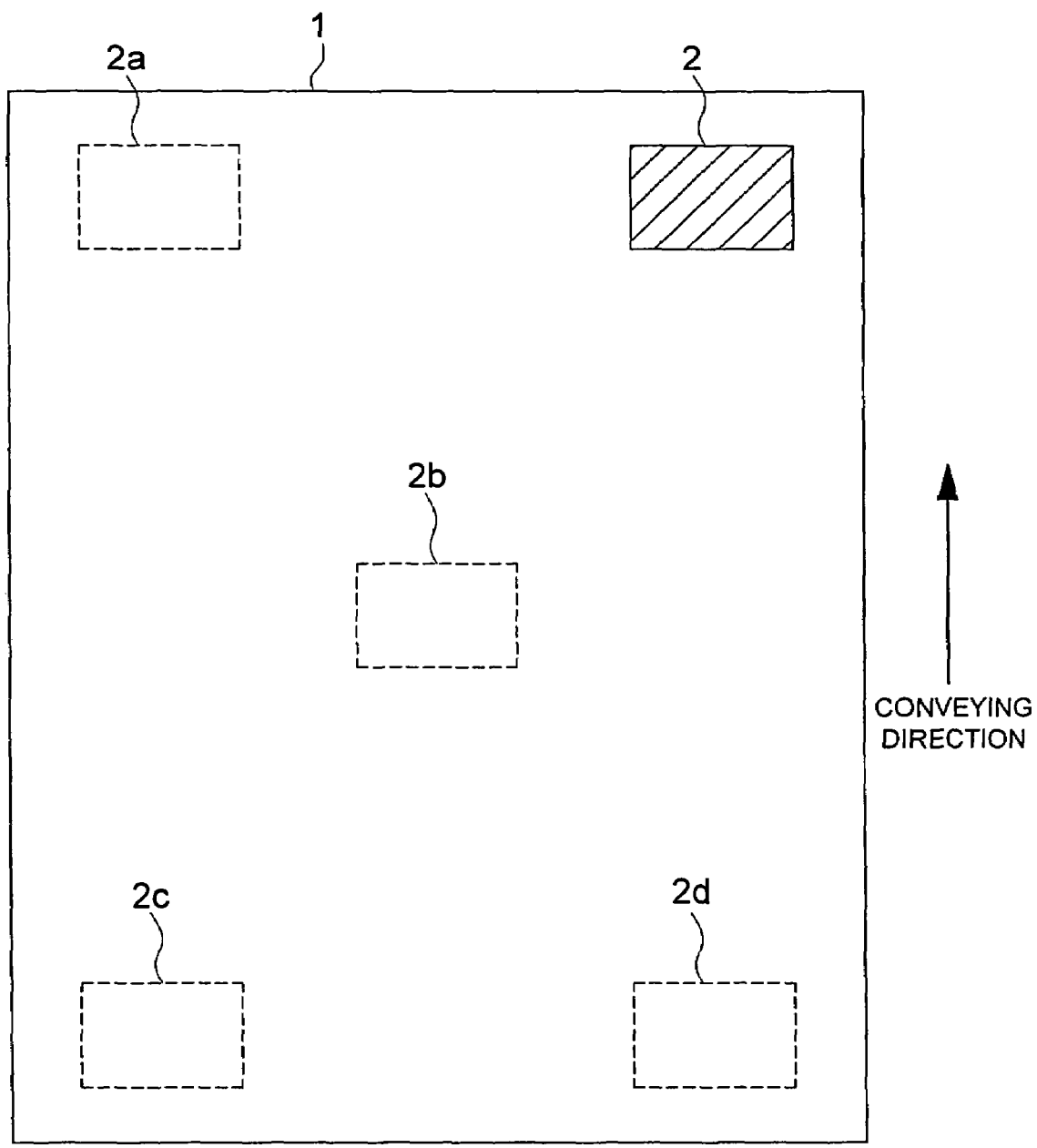
FIG. 3 is an explanatory diagram showing a typical example of the position of attaching an RFID tag to the document.

FIG. 3 is an explanatory diagram showing a typical example of the position of attaching an RFID tag 2 to the document 1. The RFID tag 2 has an IC (Integrated Circuit) that operates upon receiving power from outside in an electromagnetic manner and an antenna, it is possible to read or write information in a non-contacting manner by communicating with the wireless control section 52. Further, it is possible to read or write information independently to a plurality of RFID tags 2 present within the same communication area using the contention prevention technology.

In present preferred embodiment, one RFID tag 2 is attached to each document 1 at the top right position indicated by the hatched box in the figure. Apart from this, it is possible to use the positions of the RFID tags 2*a*-2*d* shown by broken line boxes in figure, or else any other position can also be used.

Figure 4:
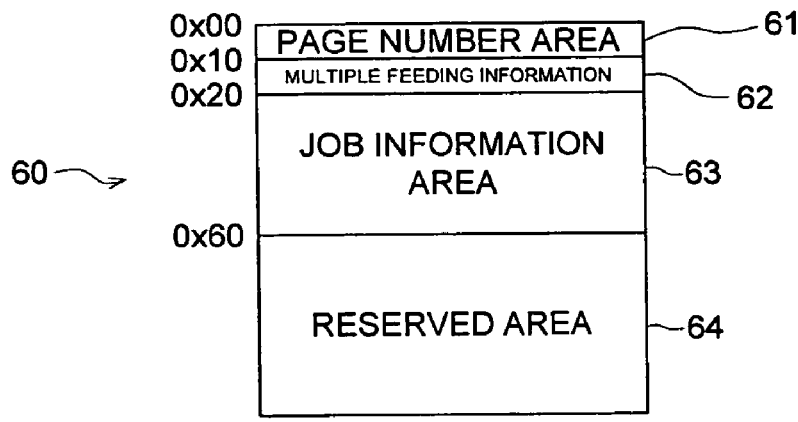
FIG. 4(a) is an explanatory diagram about the contents of the information stored in the RFID tag.
FIG. 4(b) is an explanatory diagram about the contents of the information stored in the RFID tag.
FIG. 4(c) is an explanatory diagram about the contents of the information stored in the RFID tag.
Figure 4:
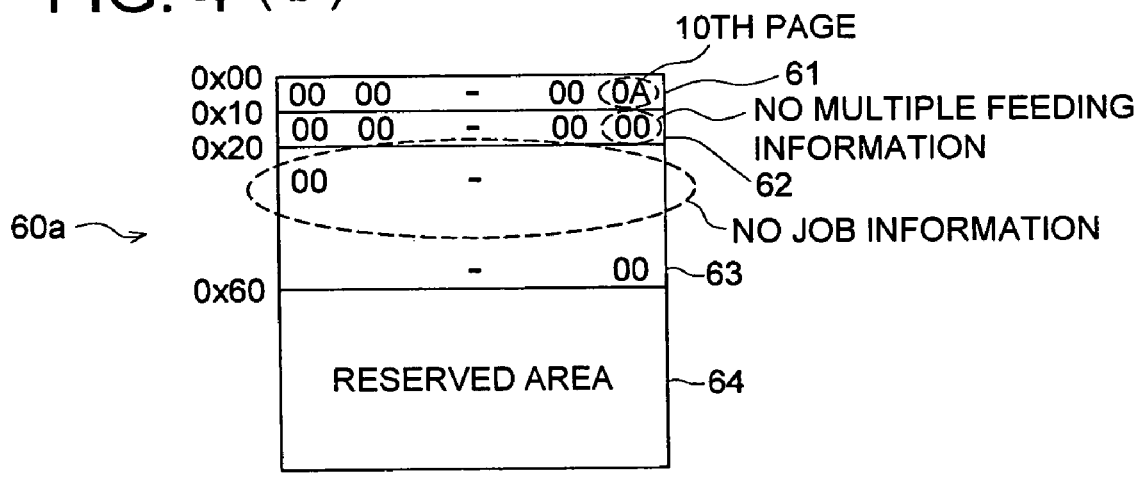
Figure 4:
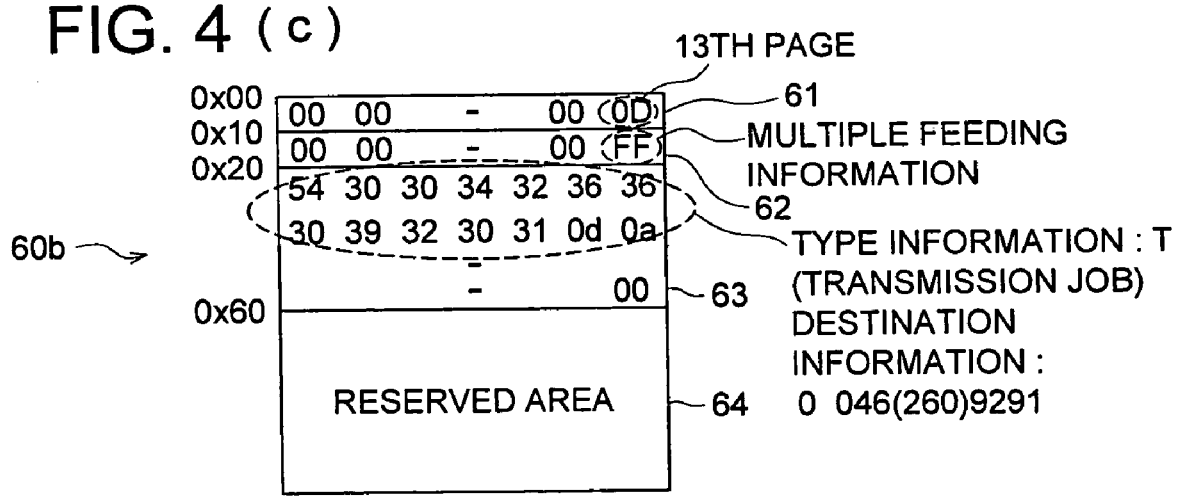

FIG. 4 is an explanatory diagram about the contents of the information stored in the RFID tag 2.

FIG. 4(*a*) shows an example of the data structure of the RFID data 60 stored in the RFID tag 2. The RFID data 60 comprises a page number area 61, an overlapping feed information area 62, a job information area 63, and a reserved area 64.

The page number area 61 is an area in which the page numbers of each sheet of the document 1 in the predetermined stack of document sheets are stored beforehand. The page numbers are stored in the hexadecimal format.

The page numbers are used for adding the images read out during the re-processing operations at the correct page position in the job suspended due to multiple feeding (suspend mode). Here, the page number read out at the time of reading the images of each sheet of the document 1 are stored in the non-volatile memory 55 while establishing relationship with the corresponding image data of the document 1.

Further, depending on the stack of document sheets, it is also possible to have RFID tags 2 in which no page number has been stored or RFID tags 2 which do not have the page number areas 61 themselves. In this case, the images read during the re-processing operations, for example, are added at the end of the image of the last page of the suspended job.

The multiple feeding information area 62 is the area in which the multiple feeding information is written. Here, "00" indicates the state in which a multiple feeding information has not been written and "FF" indicates the state in which a multiple feeding information has been written.

The job information area 63 is an area in which the job information (type information and destination information) is written. The type information is expressed in the form of a code in which "43" indicates a copy job (corresponds to the ASCII code for the leading character "C" in "Copy Job"), "53" indicates a scan job (corresponds, similarly, to "S" in "Scan Job"), "50" indicates a print job (corresponds, similarly to "P" in "Print Job"), and "54" indicates a transmission job (corresponds, similarly to "T" in "Transmission Job").

The destination information is the telephone number of the destination facsimile apparatus with each digit of the number being expressed by its ASCII code.

The page number is stored in the job information area 63 in the sequence of the type information and the destination information, at the end of which a line feed code "0D0A" (corresponds to "CR LF" in the ASCII code meaning a carriage return and line feed) has been added.

The reserved area 64 is a spare reserved area in which no data reading or writing is done normally and can be used for writing some new information other than those described above.

FIG. 4(*b*) shows an example of the RFID data 60*a* stored in the RFID tag 2 attached to a sheet of the document 1 that was not conveyed in an overlapping state. The "0A" in the page number area 61 indicates a page number of "the $10^{th}$ page", and the "00" in the multiple feeding information area 62 indicates that the multiple feeding information has not been written. In addition, the job information has not been stored in the job information area 63.

FIG. 4(c) shows an example of the RFID data 60b stored in the RFID tag 2 attached to a sheet of the document 1 that was conveyed in an overlapping state. The "0D" in the page number area 61 indicates a page number of "the 13$^{th}$ page", and the "FF" in the multiple feeding information area 62 indicates that the multiple feeding information has been written. In addition, the two leading digits "54" in the line of the job information area 63 indicates a "Transmission Job", and the number following this up to the carriage return and line feed code indicates the telephone number "046-260-9291" to which has been added a "0" for connecting to an external line from the internal extension.

Next, the two methods used by the determining section 56 to judge the occurrence of multiple feeding based on the result of detection of the RFID tag 2 attached to the document 1 are described here.

Figure 5:
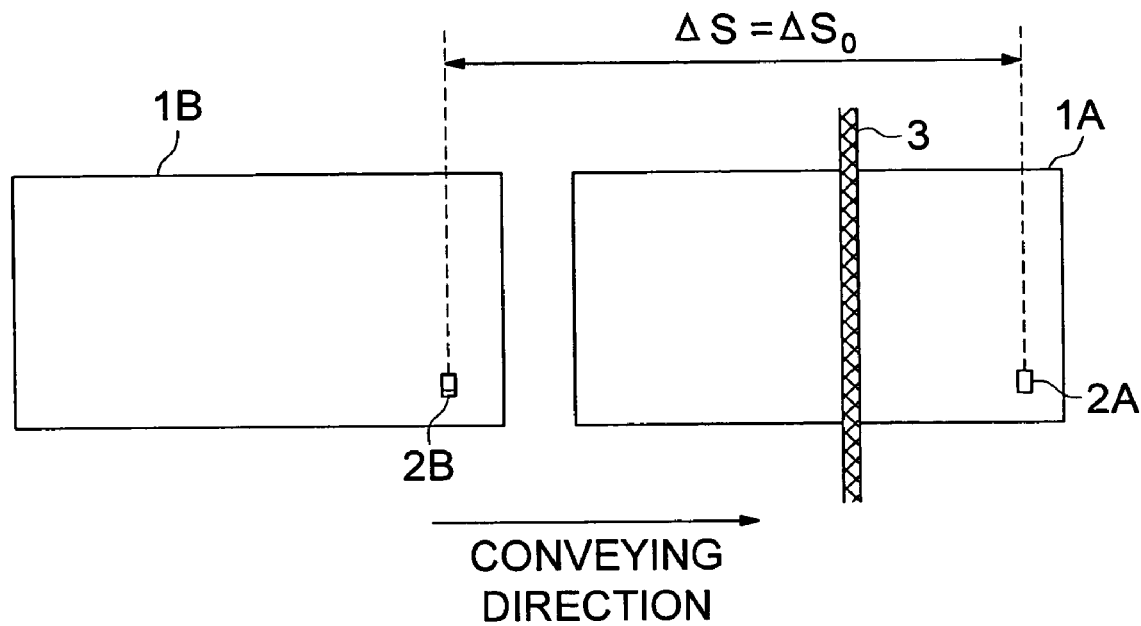
FIG. 5(a) is an explanatory diagram showing the principle of operation of judging the occurrence of multiple feeding using a first judgment method.
FIG. 5(b) is an explanatory diagram showing the principle of operation of judging the occurrence of multiple feeding using a first judgment method.
Figure 5:
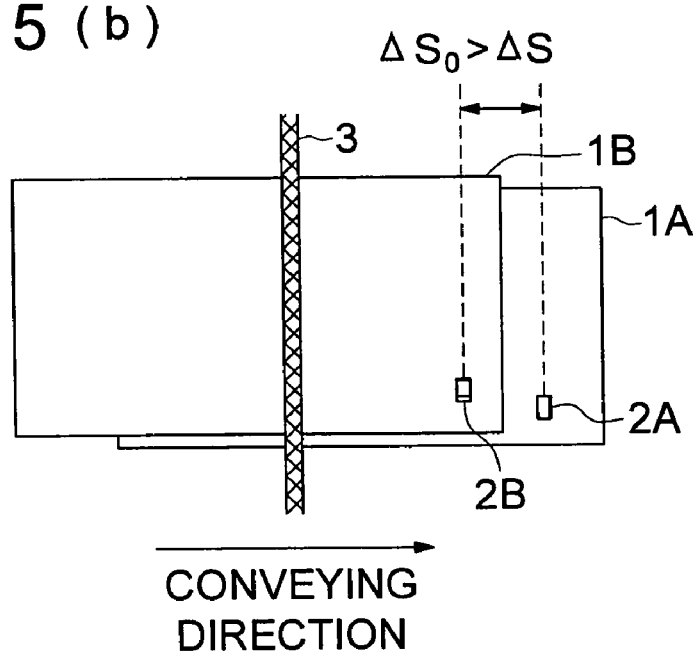

FIG. 5 shows the principle of operation of the first method of judging the occurrence of multiple feeding based on the time lag of detecting the RFID tag 2 by the detecting and reading section 53.

FIG. 5(a) shows schematically, in the condition in which a multiple feeding has not occurred, the method in which the first document 1A and the second document 1B are conveyed in the automatic document feeder 20. The first RFID tag 2A has been attached to the first document 1A and the second RFID tag 2B has been attached to the second document 1B. In this figure, all the documents are of the same size, and the orientation of each document has been arranged so that the RFID tags are at the same position, and the stack of document sheets has been placed with the horizontal (landscape) orientation.

The detection area 3 in FIG. 5(a) shows the range in which the RFID tag can be detected by the antenna 50. The detection area 3 is within the conveying path of the automatic document feeder 20. The detection area 3, for example, has a thin long shape that intersects the document at right angles with respect to the conveying direction. The detection area 3 has been set so that it can cover the entire width of the maximum-sized document that is conveyed.

In the first judgment method, the judgment of occurrence of multiple feeding is made by comparing the time difference $\Delta S$ between instant of time T1 at which the first RFID tag 2A of the first document 1A passes through the detection area 3 and the instant of time T2 at which the second RFID tag 2B of the second document 1B passes through the detection area 3 with the standard time difference. If there is no multiple feeding, the time difference $\Delta S$ becomes almost equal to the time interval at which the automatic document feeder 20 feeds the document sheets. Here, if the width of the detection area 3 is sufficiently small, the instant of time when an RFID tag is detected can be treated as being the instant of time when the RFID tag has passed the detection area. Further, when the detection area 3 is wide, it is possible to take the middle point between the instant of time when the RFID tag is started to be detected and the instant of time when it is no longer detected as the instant of time when the RFID tag has passed the detection area.

On the other hand, when there is a multiple feeding as shown in FIG. 5(b), since the distance between the RFID tags 2A and 2B becomes short to the extent of overlapping between the document sheets, the time difference $\Delta S$ becomes shorter than the time interval at which the document sheets are fed.

As explained above, the time difference $\Delta S$ between the detection of successive RFID tags varies depending on the presence or absence of multiple feeding. When there is no multiple feeding, the time difference $\Delta S$ becomes almost equal to the time interval at which the document sheets are issued. Here, in the first method of judgment, the standard time difference $\Delta S_0$ that is compared with the time difference $\Delta S$ is set as the document issuing time interval. Further, a multiple feeding is judged to have occurred when $\Delta S_0 > (\Delta S + \alpha)$, where $\alpha$ is the tolerance in the time difference. Further, both document sheets related to this time difference $\Delta S$ are judged to be documents fed in an overlapping state.

For example, the standard time difference $\Delta S_0$ is set differently depending on the document size including the horizontal or vertical orientation, and is set as 0.91 seconds for A4 (vertical), as 1.29 seconds for A4R (horizontal), as 1.83 seconds for A3, etc. These values are stored beforehand in the ROM 12. The determining section 56 selects the standard time difference $\Delta S_0$ according to the document size detected at the time of starting the job etc., and uses this as the reference for judgment.

Further, even when three sheets of documents are conveyed in an overlapping state, the method of judgment of multiple feeding does not change. Firstly, the occurrence of multiple feeding is judged for the first and the second sheets of the document. Similarly, a judgment is made for the second and the third sheets of the document. When multiple feeding has been judged to have occurred in these two cases, this will be a document in which a multiple feeding has been made of all of the first to the third sheets. The same is true when the number of document sheets that are overlapping is more.

Further, if the document size and the position of the RFID tag are the same, at whatever position within the document is the RFID tag attached, the relative distance between RFID tags of document sheets conveyed without multiple feeding will be constant. Therefore, under the condition in which the document size and the position of the RFID tag are the same, irrespective of the position of attaching the RFID tag within the document, it is possible to use a constant value of the standard time difference $\Delta S_0$.

Further, it is possible that a plurality of RFID tags is attached to each document sheet. In this case, for example, it is sufficient if one among a plurality of RFID tags with the same page number is designated as the RFID tag for judgment of multiple feeding representing the document of that page number. Further, the judgment of multiple feeding is made with reference to the time difference $\Delta S$ between the designated RFID tags of successive document sheets. In addition, the writing of the multiple feeding information can be written in the one RFID tag that has been designated or can be written in all RFID tags with the same page number.

In the above manner, since the determining section 56, unlike in the conventional method of judgment that takes as a reference the intensity of transmitted light or the pressure on the conveying belt, judges the occurrence of multiple feeding based on the result of detection of the RFID tags 2 which is the information recording medium, it is possible to judge the occurrence of multiple feeding with a high accuracy.

In particular, in the first method of judgment, since the occurrence of multiple feeding is judged based on the time difference of detecting neighboring RFID tags 2, in other words, since a multiple feeding is judged to have occurred when the difference $\Delta S$ is shorter than a predetermined time interval, it is possible to judge the occurrence of multiple feeding with a simple configuration without requiring a sensor that detects the document issuing timing or the absolute position of the document being conveyed.

Next, the second method of judgment is explained below.

Figure 6:
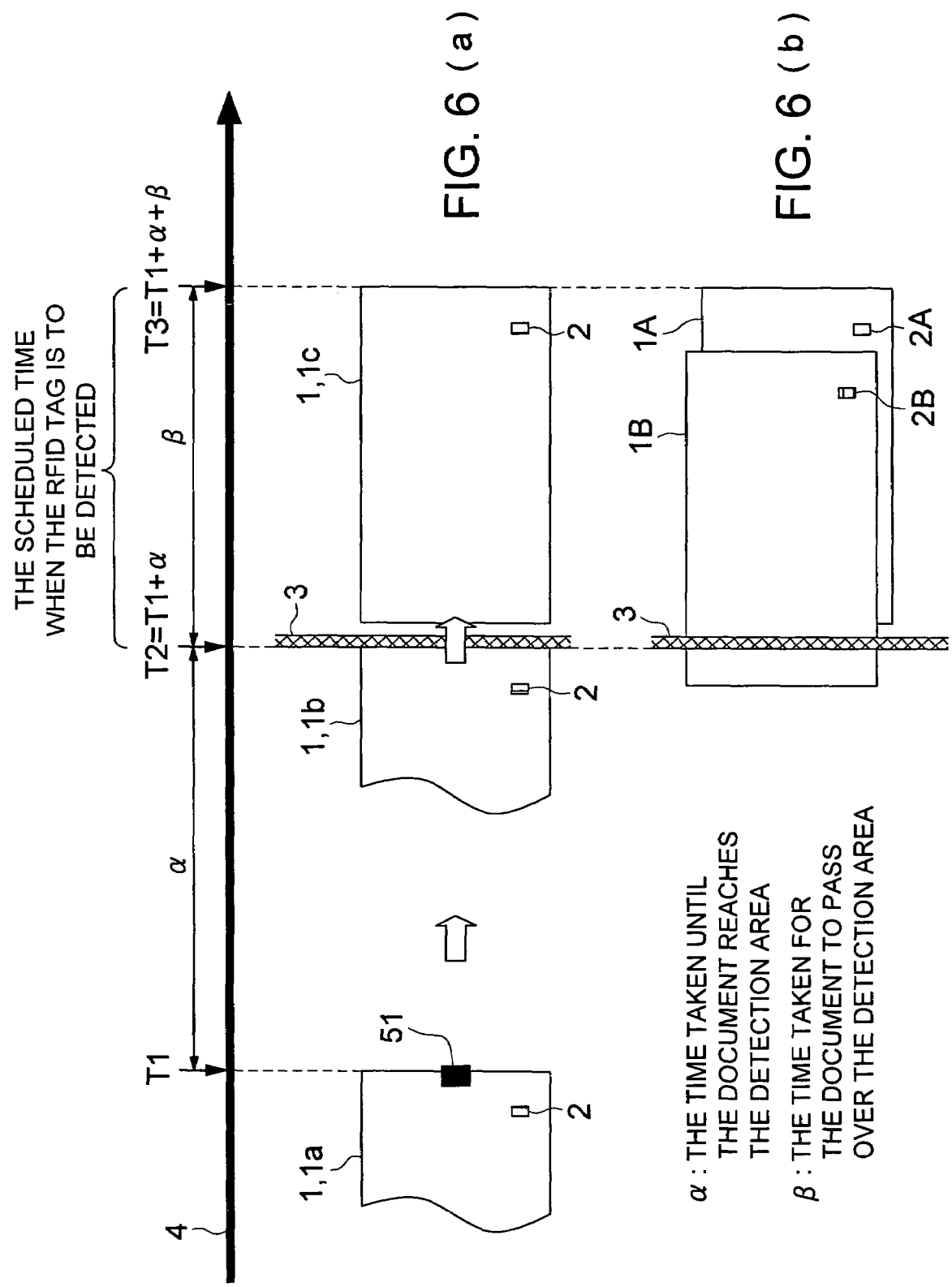
FIG. 6(a) is an explanatory diagram showing the principle of operation of judging the occurrence of multiple feeding using a second judgment method.
FIG. 6(b) is an explanatory diagram showing the principle of operation of judging the occurrence of multiple feeding using a second judgment method.

FIG. 6 shows the principle of operation of the second method. In the second method of judgment, taking as reference the instant of time that the document sensor 51 detects the document, the absolute time interval (the scheduled time interval) for which the document issued by the automatic document feeder 20 passes over the detection area 3 is determined, and the judgment of the occurrence of multiple feeding is made based on the status of detection of the RFID tag 2 within that time interval.

FIG. 6(a) shows schematically, in the condition in which a multiple feeding has not occurred, the mode in which the document 1 is conveyed. The horizontal axis in the figure represents the time axis. The document 1a issued from the loading tray 21 is detected by the document sensor 51 at the instant of time T1. Thereafter, at the instant of time T2 (=T1+ $\alpha$) after a period of $\alpha$, the front edge of the same document 1b arrives at the detection area 3. The time interval $\alpha$ until the document arrives at the detection area 3 is determined in absolute terms by the distance from the document sensor 51 to the detection area 3 and the speed of conveying the document.

Further, after the elapse of a time interval of $\beta$ at the instant of time T3 (=T1+$\alpha$+$\beta$), the rear edge of the same document 1c passes through the detection area 3. The time interval $\beta$ until the document passes over the detection area 3 is determined in absolute terms, if the width of the detection area 3 is sufficiently small, by the document size and the speed of conveying the document.

Here, the RFID tag 2 of the document 1 detected by the document sensor 51 at the instant of time T1, whatever be the position of the document at which it is attached, is detected during the period from the instant T2 when the front edge of the document 1 arrives at the detection area 3 to the instant T3 when the rear edge of the document 1 complete passing over the detection area 3. Therefore, the interval "Time T2–Time T3" corresponds to the "scheduled time in which the RFID tag 2 is detected". For example, in FIG. 6(a), one RFID tag 2 is being detected during this period.

On the other hand, if there is a multiple feeding as shown in FIG. 6(b), two RFID tags 2A and 2B of the first document 1A and the second document 1B are detected during this period. In addition, when three or more sheets of the document are conveyed in an overlapping state, similarly, three or more RFID tags are detected.

In the above manner, the number of RFID tags detected during the "scheduled time in which the RFID tag 2 is detected" varies depending on the presence or absence of multiple feeding. Here, in the second method of judgment, the "scheduled time in which the RFID tag 2 is detected (Time T2–Time T3)" is obtained taking as reference the instant of time when the different document sheets are detected by the document sensor 51, and the occurrence of multiple feeding is judged based on the number of RFID tags detected during this period. If RFID tags of a plurality of document sheets (a number of tags more than the number of tags attached to one sheet of the document) are detected during this period, multiple feeding is judged to have occurred for all the document sheets to which those RFID tags are attached.

The time interval $\alpha$ until the document arrives at the detection area 3 is stored beforehand in the ROM 12 etc. In a similar manner, even the time interval $\beta$ taken for the document to pass over the detection area 3 is stored in the memory for each document size including the horizontal or vertical orientation of the document. For example, the determining section 56 selects the time interval $\beta$ depending on the document size detected at the time of starting the job etc. Further, even the number of RFID tags attached to one sheet of the document is also stored in the memory, and the occurrence of multiple feeding is judged by comparing that stored number of RFID tags with the number of RFID tags actually detected from each sheet of the document.

Further, instead of using the time interval $\beta$ that is determined based on the document size, it is possible to add a fixed interval $\alpha$ to the instant of time when the rear edge of the document is detected by the document sensor 51 and to take it as the instant of time T3 at which the rear edge of that document completes passing through the detection area 3. Apart from this, it is also possible to treat the position immediately before the next document as the rear edge of that document. In this case, it is possible to take an instant of time obtained by adding a fixed interval $\alpha$ to the instant of time when the automatic document feeder 20 starts to issue the next document as the instant of time T3 at which the rear edge of the document issued earlier completes passing through the detection area 3.

For any document, since the scheduled time at which the RFID tag attached to the document has to be detected is determined in absolute terms according to the size of the document, even if the size of the document sheets included in the stack of documents and the position of the RFID tag attached to each document are not uniform, it is possible to judge correctly the occurrence of multiple feeding.

Further, the method of judging the occurrence of multiple feeding based on the result of detection of RFID tags need not be limited to the first and second judgment methods described so far. For example, it is also possible to judge the occurrence of multiple feeding using the RFID tags placed at the front edge and the rear edge of the document. In concrete terms, RFID tags are fixed respectively at two or more diagonally opposite apex points of the document, the identification information of that document is stored in each of them. Next, assume that the identification information of the first document is "A" and of the second document is "B". If no multiple feeding occurs, the identification information of the documents being conveyed will be read out in the sequence of "A (front edge), A (rear edge), B (front edge), B (rear edge), . . . ". On the other hand, if there is a multiple feeding the identification information will be read out in a sequence such as "A (front edge), B (front edge), A (rear edge), B (rear edge), . . . ". In this manner, the sequence in which the identification information of one sheet of document is read out differs depending on the presence or absence of multiple feeding. Therefore, it is possible to store beforehand a rule that "when there is no multiple feeding, pairs of the same identification information are read out successively", and to judge that a multiple feeding has occurred if the identification information is read out in a sequence that differs from this rule. Further, by attaching RFID tags to two diagonally opposite apex points, it is permissible to place the document with its top or bottom edge as the front edge, and also it is possible to place the document in either the horizontal or the vertical orientation.

Figure 7:
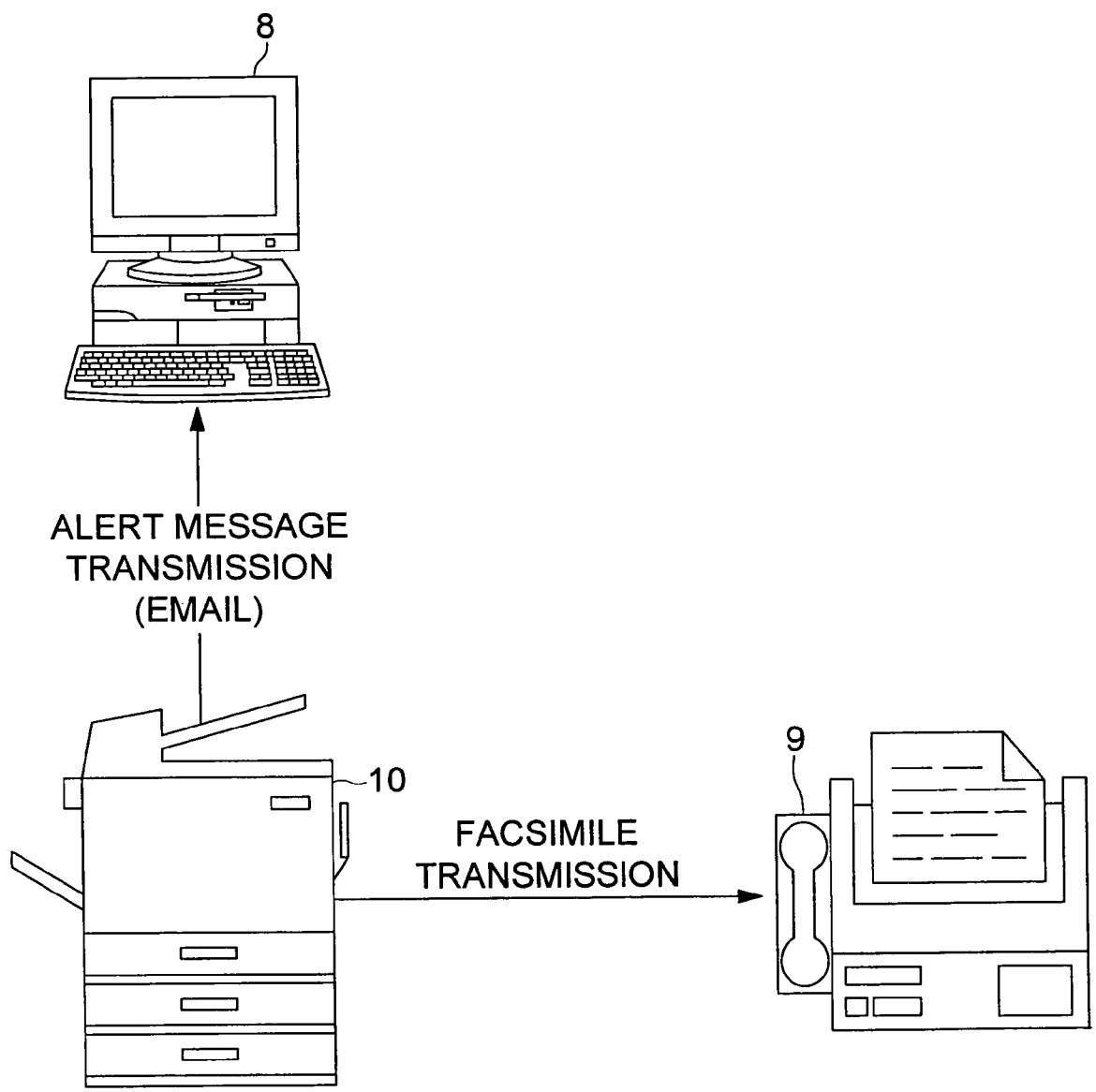
FIG. 7 is an example of the system configuration using an image processing apparatus according to the first preferred embodiment of the present invention.

FIG. 7 is an example of the system configuration using an image processing apparatus 10. This system is configured to comprise an image processing apparatus 10 according to a preferred embodiment of the present invention, a facsimile apparatus 9 that is connected to the image processing apparatus 10 via a public switched telephone network line, and a PC 8 that is connected via a network such as a LAN (Local Area Network).

The facsimile apparatus 9 carries out the function of a recipient of image data related to transmission jobs. The facsimile apparatus 9 can also be configured as a multi function peripheral that can execute the reception job of receiving image data using the facsimile function.

The PC 8 carries out the function of a predetermined terminal that receives warning messages of the occurrence of multiple feeding using email. The PC 8 can be a PC of the user who executed the job which is the target of the warning or can be a PC of the manager of the image processing apparatus 10.

Figure 8:
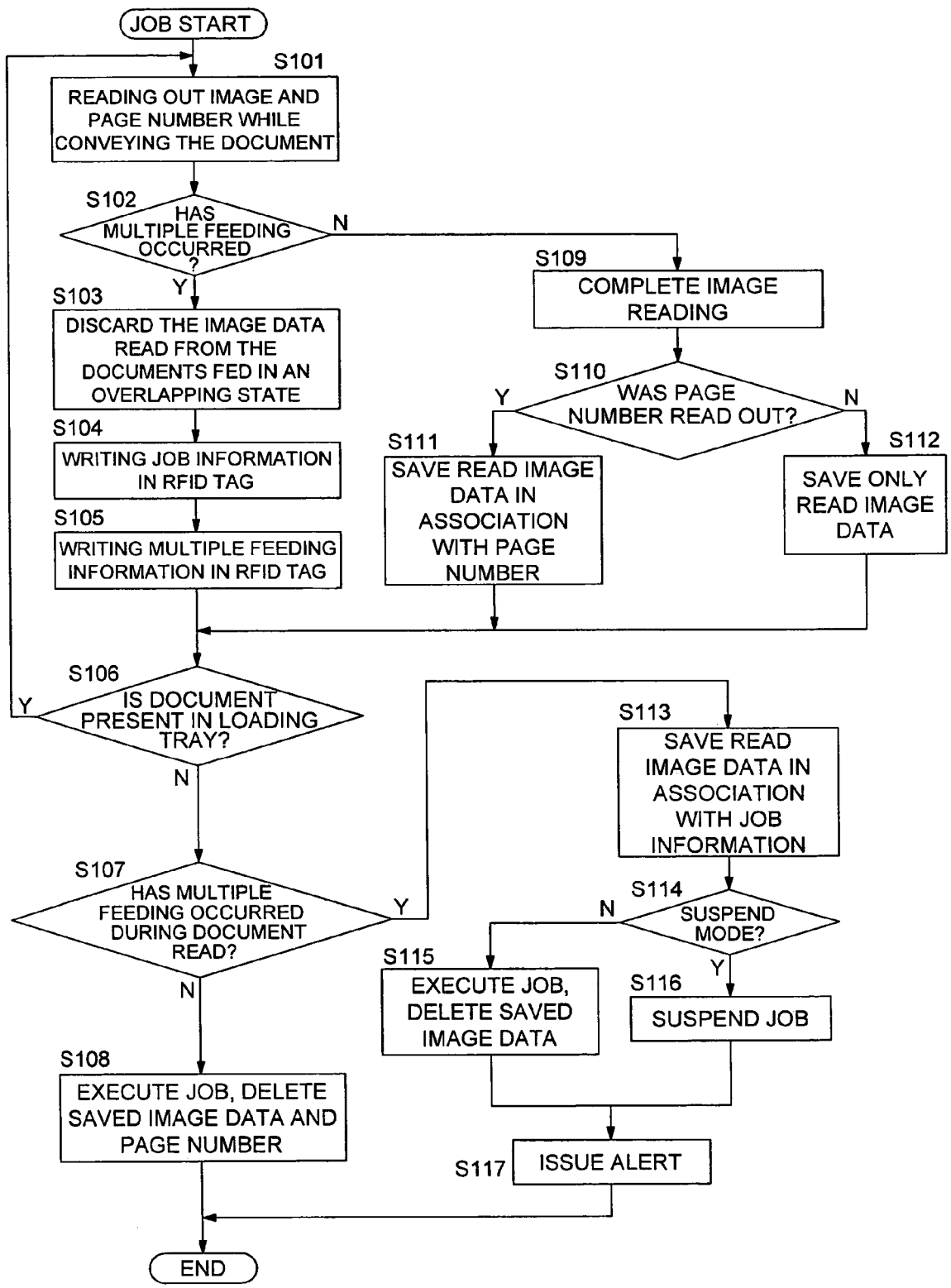
FIG. 8 is a flow diagram showing the flow of operations of judging the occurrence of multiple feeding during the execution of a job by an image processing apparatus according to the first preferred embodiment of the present invention, and of continuing or suspending that job.

FIG. 8 is a flow diagram showing the flow of operations of judging the occurrence of multiple feeding during the execution of a job by an image processing apparatus 10 according to the first preferred embodiment of the present invention, and of continuing or suspending that job. The determining section 56 can judge the occurrence of multiple feeding in either the first judgment method or in the second judgment method.

When a job starts, the image processing apparatus 10 reads out images while conveying one sheet at a time of the document 1 in automatic document feeder 20 (Step S101). If the page number has been stored in the RFID tag 2, the page number is read out at this time (Step S101).

Next, a judgment is made as to whether or not multiple feeding has occurred (Step S102), if a multiple feeding has not occurred (N in Step S102), the reading of the image of that document 1 is completed (Step S109).

Next, a check is made of whether or not the page number was read out from the RFID tag 2 (Step S110), if it has been read out (Y in Step S110), the read out image data is stored while establishing correspondence with the page number (Step S111), and a check is made of whether or not a document 1 is present on the loading tray 21 (Step S106). If the page number has not been read out (N in Step S110), only the read out image data is stored (Step S112), and a check is made of whether or not a document 1 is present on the loading tray 21 (Step S106).

Further, when a multiple feeding is judged to have occurred (Y in Step S102), the image data read out for the document that was fed in an overlapping state is discarded (Step S103). Next, the job information is written in the RFID tag 2 (Step S104), in addition, the multiple feeding information is written (Step S105), and a check is made of whether or not a document 1 is present on the loading tray 21 (Step S106).

If any sheet of the document 1 is remaining on the loading tray 21 (Y in Step S106), the operations up to this point are repeated (Steps S101-S106, S109-S112).

If no sheet of the document 1 is remaining on the loading tray 21 (N in Step S106), a check is made as to whether or not a multiple feeding occurred while reading the document (Step S107), if a multiple feeding has not occurred (N in Step S107), the job is executed as it is, the saved image data and page number are deleted (Step S108), and the operations are terminated (END).

If a multiple feeding has occurred (Y in Step S107), the read image data is stored while establishing correspondence with the job information related to the job being executed (Step S113), and a check is made as to whether the current setting is the suspend mode or not (Step S114). If the current setting is the forced execution mode (N in Step S114), the job is executed only for the read images from the document 1 excepting those at which a multiple feeding was made, the saved image data is deleted (Step S115), a warning is issued indicating that a multiple feeding occurred during the execution of the job (Step S117), and the operation is terminated (END).

If the current setting is the suspend mode (Y in Step S114), the job is suspended as it is (Step S116), a warning is issued indicating that a multiple feeding occurred during the execution of the job (Step S117), and the operation is terminated (END).

By writing the overlapping document information in the RFID tag 2 of the document 1 which has been fed in an overlapping state, it is possible to identify later on at which document 1 did the multiple feeding occur. Because of this, it is not necessary to interrupt the operation of reading the document 1 at the instant when a multiple feeding occurs in order to inform the user of the position at which the multiple feeding occurred.

Further, by writing the job information related to the job being executed in the RFID tag 2 of the document 1 which was fed in an overlapping state, it is possible to read this information later on and execute a job with the same contents without having to carry out again the setting operations.

Figure 9:
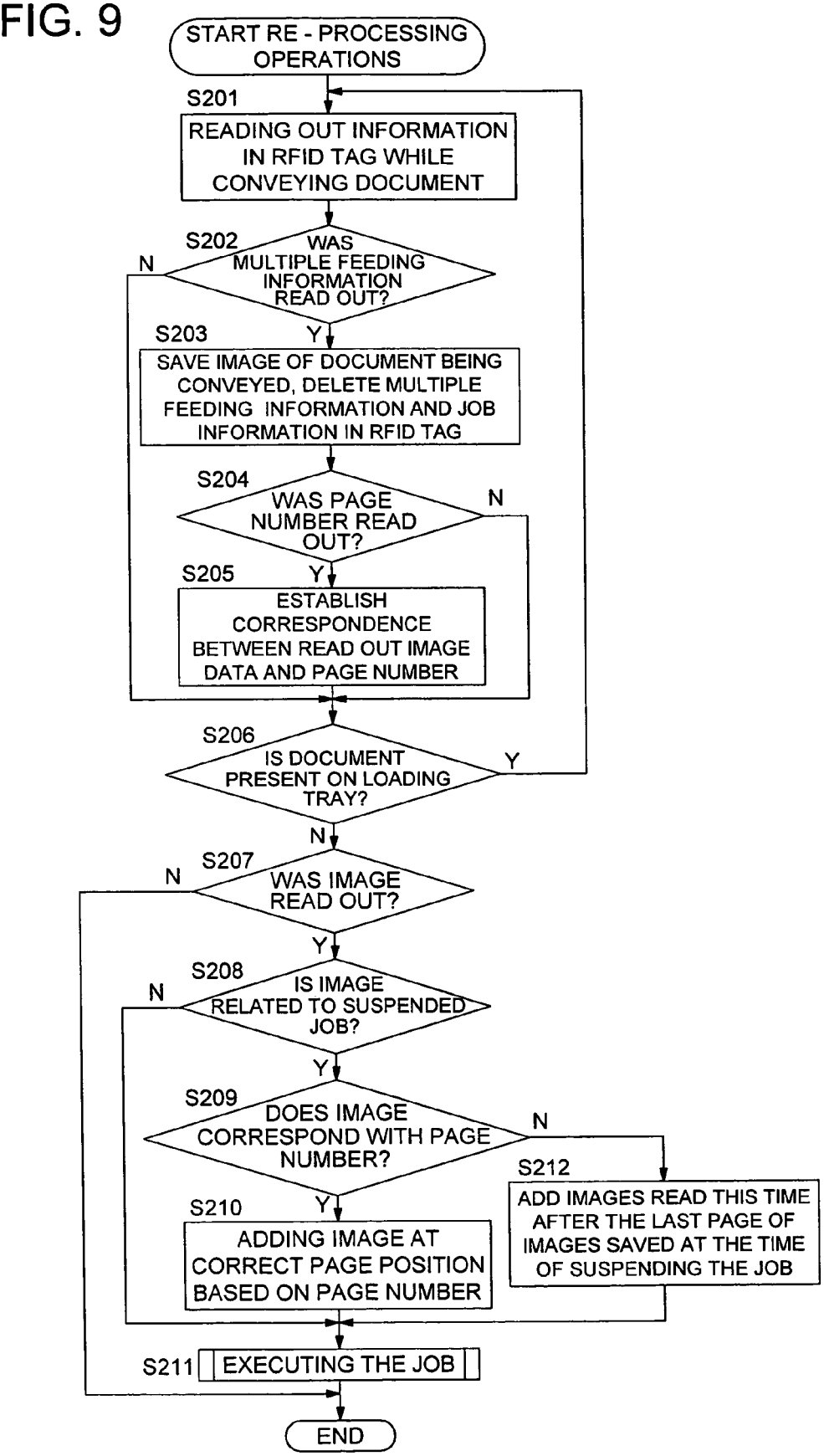
FIG. 9 is a flow diagram showing the flow of reprocessing operations executed by an image processing apparatus according to the first preferred embodiment of the present invention.

FIG. 9 is a flow diagram showing the flow of re-processing operations executed by an image processing apparatus 10 according to the first preferred embodiment of the present invention.

The re-processing operations are started when an execute instruction is received from a user who has come to know about the occurrence of a multiple feeding from a warning etc. The image processing apparatus 10 reads out the information in the RFID tag 2 while conveying the document 1 loaded on the loading tray 21 using the automatic document feeder 20 (Step S201). At this time, a check is made as to whether or not the multiple feeding information was read out for each page of the document 1 (Step S202), if there is no multiple feeding information (N in Step S202), a check is made as to whether or not document 1 is present on the loading tray 21 (Step S206).

If a multiple feeding information has been read out (Y in Step S202), the image read from the document 1 being conveyed is stored, and the multiple feeding information and job information in the RFID tag 2 are erased (Step S203). If a page number is not included in the information read out from the RFID tag 2 (N in Step S204), a check is made as to whether or not document 1 is present on the loading tray 21 (Step S206).

On the other hand, if a page number is included in the information read out from the RFID tag 2 (Y in Step S204), a correspondence is established between the read image data and the page number (Step S205), and a check is made as to whether or not document 1 is present on the loading tray 21 (Step S206).

If any sheet of the document 1 is remaining on the loading tray 21 (Y in Step S206), the operations up to this point are repeated (Steps S201-S206).

If no sheet of the document 1 is remaining on the loading tray 21 (N in Step S206), a check is made as to whether or not images were read out in the operations up to this point (Step S207), if no images have been read out (N in Step S207), the operations are terminated as it is (END).

If some image has been read out (Y in Step S207), a check is made as to whether or not the read image is related to the job kept under suspension (Step S208). If the setting at the time of occurrence of the multiple feeding is the forced execution mode (N in Step S208), the job is executed as it is (Step S211).

When there is some image related to the job kept under suspension (Y in Step S208), a check is made as to whether or not the image data read out in the operation of Step S205 has correspondence established with the page number (Step S209). If no correspondence with the page number has been established (N in Step S209), the image data read this time is added at the end of the last page of the image saved at the time of suspending the job (Step S212), and the job is executed (Step S211).

If a correspondence has been established with a page number (Y in Step S209), the image read this time is added at the correct page position based on the page number (Step S210), and the job is executed (Step S211).

When the operations of the above steps are completed, the job is executed according to the mode set at the time of occurrence of the multiple feeding (Step S211), and the operations are terminated (END).

Figure 10:
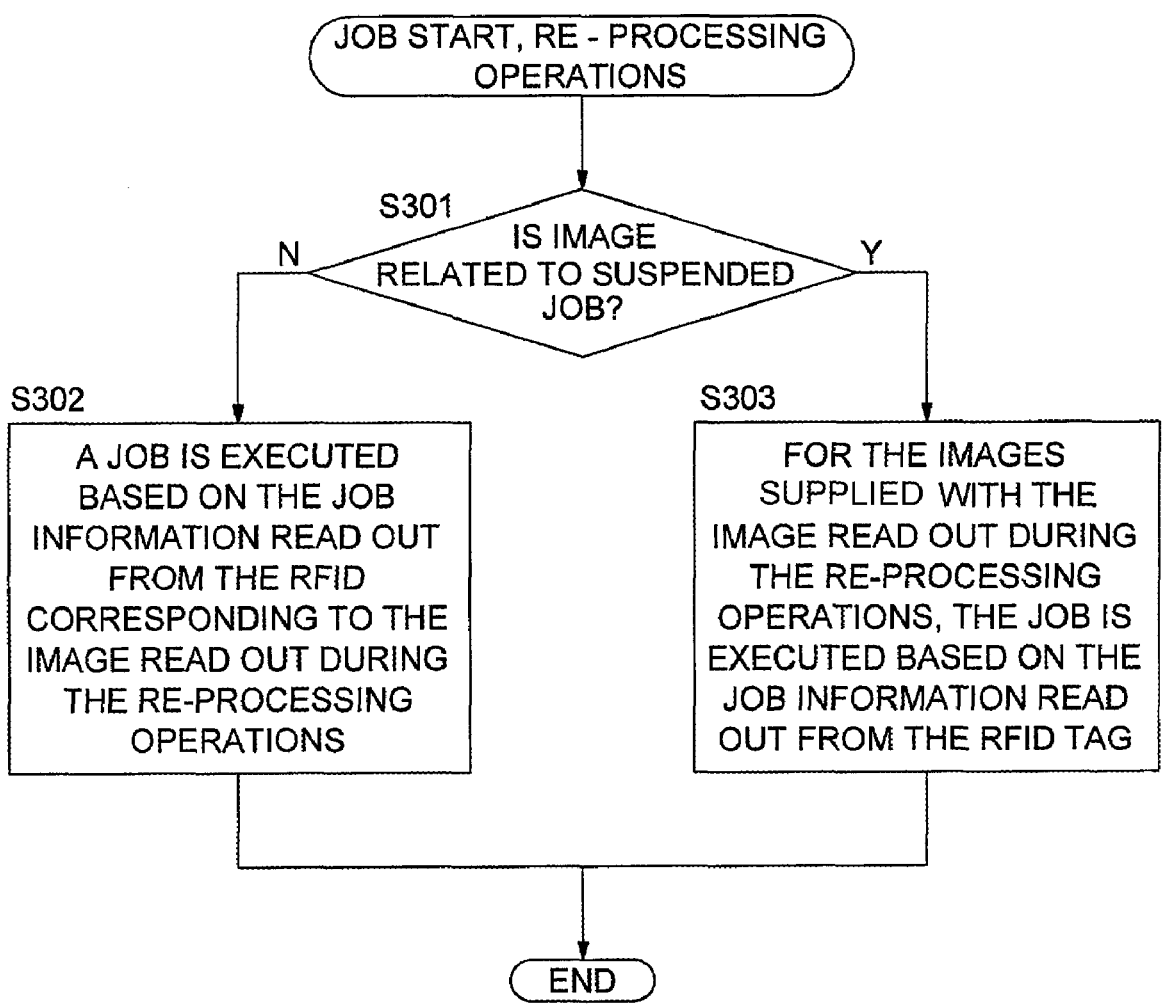
FIG. 10 is a flow diagram showing the flow of operations of executing a job during the reprocessing operations executed by an image processing apparatus according to the first preferred embodiment of the present invention.

FIG. 10 is a flow diagram showing the flow of operations (corresponds to Step S211 in FIG. 9) of executing a job during the re-processing operations executed by an image processing apparatus 10 according to the first preferred embodiment.

When a job of re-processing operations is started, a judgment is made as to whether or not the setting at the time of occurrence of multiple feeding of the read document 1 was the forced execution mode or the suspend mode (Step S301). If the setting was the forced execution mode (N in Step S301), a job is executed based on the job information read out from the RFID tag 2 attached to the document 1 corresponding to the image read out during the re-processing operations (Step S302), and the operations are terminated (END).

For example, if the job under execution at the time of occurrence of the multiple feeding was a transmission job, only the image read out during the re-processing operations are transmitted by facsimile transmission. Further, if it was a copy job, only the image read out during the re-processing operations are printed.

Further, if the setting at the time of occurrence of multiple feeding of the read document 1 was the suspend mode (Y in Step S301), for the images read out during the re-processing operations and whose addition has been completed, the job is executed based on the job information read out from the RFID tag 2 (Step S303), and the operations are terminated (END).

In the suspend mode, the images read out during the re-processing operations are added as images of the job that is in the suspended state. Because of this, for example, if the job under execution at the time of occurrence of the multiple feeding was a transmission job, the images of the entire stack of documents including the document 1 which was fed in an overlapping state are transmitted by facsimile transmission. Further, if it was a copy job, the images of the entire stack of documents including the document 1 which was fed in an overlapping state are printed.

As a summary of the above flow of operations, the details of processing made for the document 1 and images from the occurrence of a multiple feeding until the re-processing operations are completed are explained separately for each mode below.

FIG. 11 shows schematically the details of the processing made for each sheet of document 1 and its image in the suspend mode. In FIG. 11, the case is explained here, while carrying out some job after reading the images "A, B, C, D, and E" from five sheets of the document 1, when a multiple feeding occurred between the sheets of the document 1 having the images "C and D".

FIG. 11(a) shows the contents of processing in the event of occurrence of a multiple feeding. When a multiple feeding occurs during the execution of the document read operation, the multiple feeding information and the job information are written in the RFID tags 2 of each of the sheets of document 1 that were fed in an overlapping state (shown by hatched boxes in the figure). The image data "C and D" corresponding to these sheets of the document 1 are not stored within the image processing apparatus 10. On the other hand, for all the sheets of the document 1 other than those that were fed in an overlapping state, the reading of the images and the reading of the page numbers from the RFID tags 2 are continued. Next, the image data "A, B, and E" obtained by the reading operation and the page numbers corresponding to those images are stored inside the image processing apparatus 10, and the execution of the job is kept in suspension.

FIG. 11(b) shows the contents of processing during the re-processing operations. When the re-processing operations are started, the sheets of the document 1 related to the multiple feeding are identified based on the multiple feeding information and the corresponding image data "C and D" and their page numbers are acquired. On the other hand, the image data "A, B, and E" related to the job kept in suspension would have been stored in the image processing apparatus 10. The images read during the re-processing operations are added as the image data related to this job kept in suspension. If the correspondence between the images and page numbers has been established, the image data read during the reprocessing operations are added at the page positions based on the page number. The job that has been kept under suspension is executed based on the job information for the image data after completion of addition.

In the suspend mode, even after the occurrence of a multiple feeding the reading operation of the document 1 is continued up to the end and then the job is temporarily closed. Because of this, even if a multiple feeding occurs, it is possible to release the use of the image processing apparatus 10 to other users. Further, the job is not executed in the incomplete state after occurrence of a multiple feeding but is kept in suspension, and the job is executed after the sheets of the document 1 at which the multiple feeding occurred are added. Because of this, the output processing such as printing or transmission of the images of the document is executed in one combined operation.

Further, the sheets in the document 1 for which a multiple feeding had occurred previously are identified automatically and their images are read out. Because of this, it is not necessary for the user to manually verify at which sheets of the document has a multiple feeding has occurred. In addition, the convenience is enhanced because it is possible to execute a job with the same details as at the time of occurrence of the multiple feeding can be executed again without having to carry out the setting operations again.

When the page numbers have been recorded in the RFID tags 2, the images of the document 1 read out during the re-processing operations are added at the page positions based on the page numbers. Because of this, the job is executed in the same state including the order of the pages as that when the reading operation of the entire stack of document sheets is completed normally without any multiple feeding occurring, and hence there is no need for the tedious task of re-arranging the pages.

FIG. 12 shows schematically the details of the processing done for the different pages of the document 1 and their images during the forced execution mode. The pre-conditions are the same as in the example shown in FIG. 11.

FIG. 12(a) shows the contents of processing in the event of occurrence of a multiple feeding. When a multiple feeding occurs during the execution of the document read operation, the multiple feeding information and the job information are written in the RFID tags 2 of each of the sheets of document 1 that were fed in an overlapping state (shown by hatched boxes in the figure). The image data "C and D" corresponding to these sheets of the document 1 are not stored within the image processing apparatus 10. On the other hand, for all the sheets of the document 1 other than those that were fed in an overlapping state, the reading of the images is continued. Next, the job is executed for the image data "A, B, and E" read out normally and the processing is completed.

FIG. 12(b) shows the contents of processing during the re-processing operations. When the re-processing operations are started, the sheets of the document 1 related to the multiple feeding are identified based on the multiple feeding information and the corresponding image data "C and D" are acquired. At the same time, the job information is read out from the RFID tag 2 of the document 1 at which the multiple feeding had occurred. Next, the job is executed for the images read out during the re-processing operations based on the job information. Because of this, the same processing as that executed for the normally read out images at the time of occurrence of the multiple feeding is executed.

In the forced execution mode, the sheets of the document 1 which had previously been fed in an overlapping state are automatically identified and their images are read out. Next, the job that had not been executed for these sheets of the document 1 at the time of occurrence of the multiple feeding is executed automatically. Because of this, it is not necessary for the user to manually verify at which sheets of the document has a multiple feeding has occurred. In addition, since the job is executed only for the sheets of the document 1 which had been fed previously in an overlapping state, it is helpful in reducing the processing time and in saving the resources of paper or toner in the case of a job requiring print output.

Further, using the multiple feeding information and the job information stored in the RFID tag 2, even with an image processing apparatus 10 at a different location, it is possible to execute the same job as that at the time of occurrence of the multiple feeding without having to carry out the setting operations again. For example, when a transmission job from one's own company fails due to a multiple feeding, it is possible to transmit only the image of the sheet of the document 1 at which the multiple feeding had occurred using an image processing apparatus 10 with the same function at the place that the user is visiting.

Figure 13:
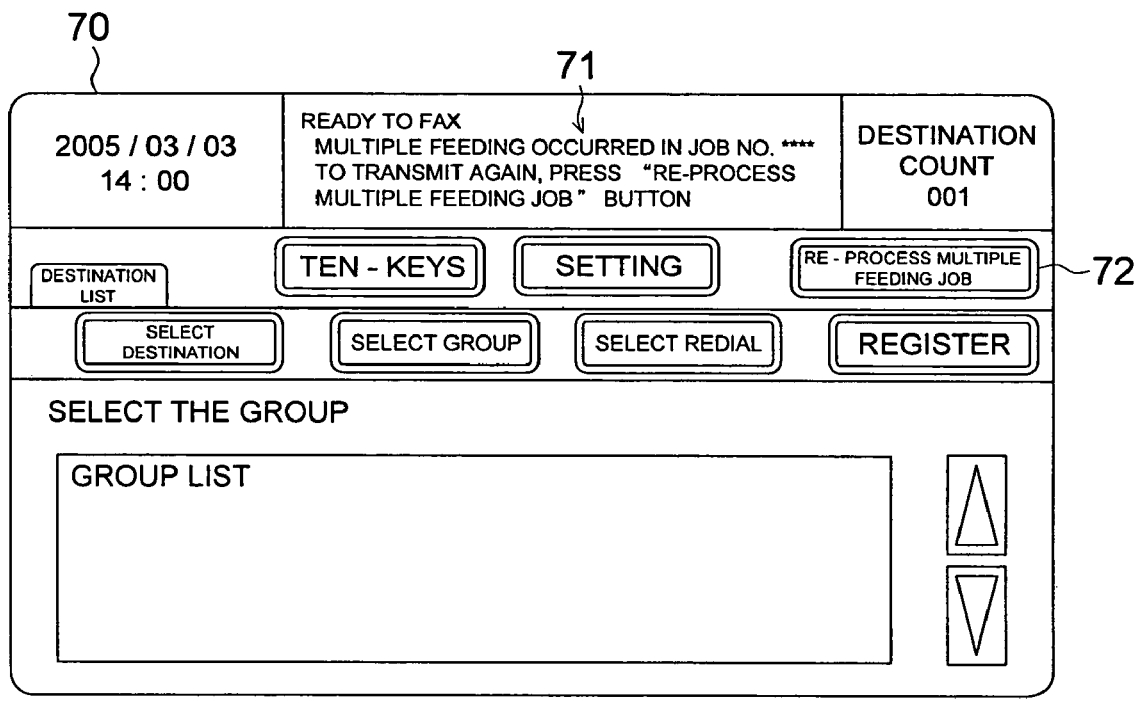
FIG. 13 is an explanatory diagram showing an example of the state in which a warning message is being displayed in the facsimile operation screen indicating the fact that a multiple feeding has occurred.

FIG. 13 shows an example of the state in which a warning message is being displayed in the facsimile operation screen 70.

The facsimile operation screen 70, is a touch panel screen that accepts the operations of a transmission job using the facsimile function. The warning message 71 is a warning display to inform the user that a multiple feeding has occurred during the execution of a job. The warning message 71 comprises the job number of the job at the time of occurrence of the multiple feeding and a guidance message prompting the user to carry out re-processing operations.

The multiple feeding job reprocessing button 72 is a button for switching the display screen to the screen for accepting instruction from the user for executing the re-processing operations. The multiple feeding job reprocessing button 72 also has the function of displaying the warning display informing the user of the occurrence of a multiple feeding. The multiple feeding job reprocessing button 72 is displayed in the facsimile operation screen 70 only when a multiple feeding is judged to have occurred.

Further, a similar warning message 71 and a multiple feeding job reprocessing button 72 are displayed even in the operation screens, not shown in the figure, for other types of jobs such as scan jobs. Because of this, a warning is issued when a multiple feeding occurs during the execution of all types of jobs. In addition, when transmitting the warning to a predetermined terminal, for example, a message with the same content as the warning message 71 is transmitted.

Figure 14:
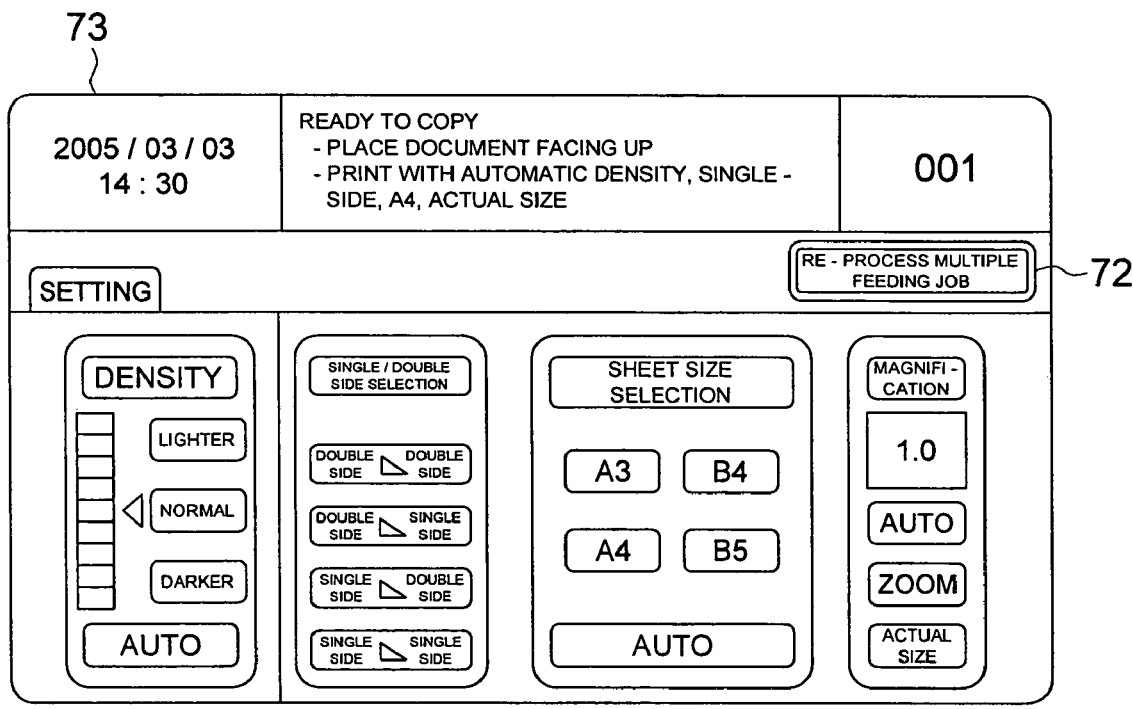
FIG. 14 is an explanatory diagram showing an example of the state in which the multiple feeding reprocessing button is being displayed in the main screen.

FIG. 14 is an explanatory diagram showing an example of the state in which the multiple feeding job reprocessing button 72 is being displayed in the main screen 73. The main screen 73 is a touch panel screen that accepts the operations for copying jobs and is displayed as the default display in the state in which no job has been accepted yet. The multiple feeding job reprocessing button 72 has the function of a warning display that warns the user the re-processing operations have not been made after a multiple feeding has occurred. In spite of a warning having been given such as that shown in FIG. 13, if the re-processing operations have not been made, the multiple feeding job reprocessing button 72 will continue to be displayed even if the display screen has changed.

Figure 15:
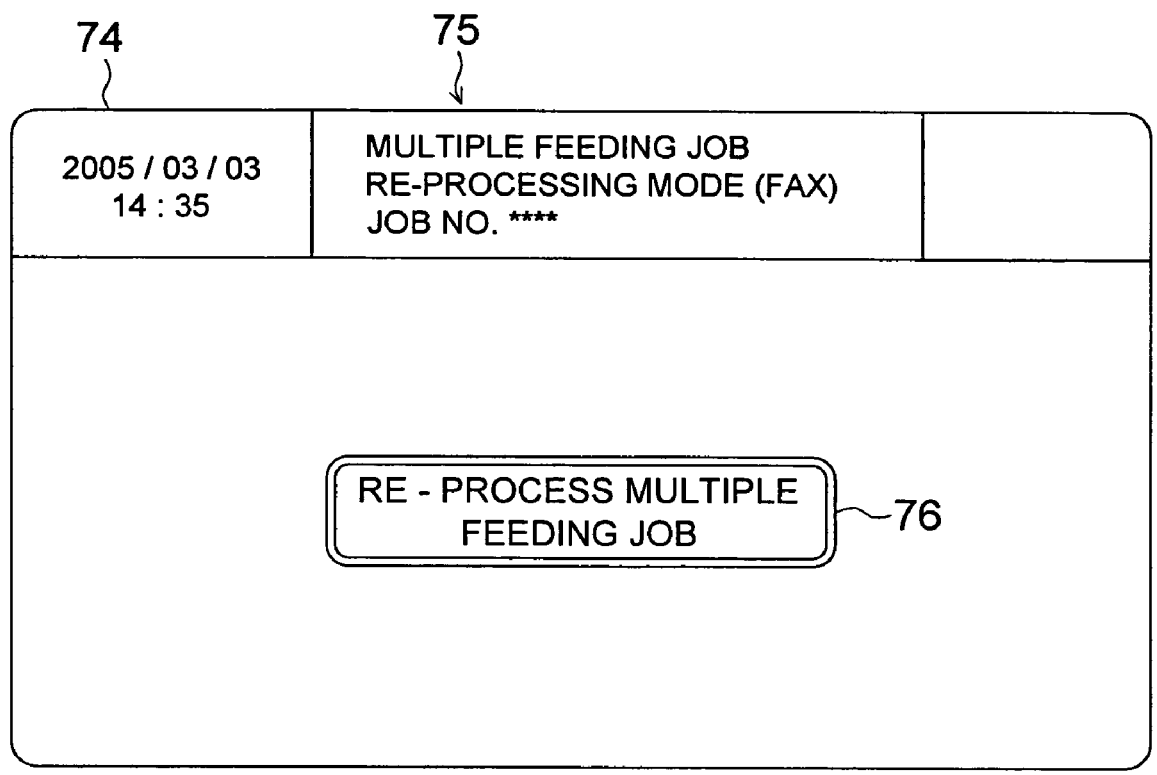
FIG. 15 is an explanatory diagram showing an example of the reception screen which receives from the user an instruction to execute the reprocessing operations.

FIG. 15 shows an example of the reception screen 74 that accepts from the user the instruction to execute the re-processing operations. The reception screen 74 is a screen that is displayed selectively when the multiple feeding job reprocessing button 72 is pressed in the facsimile operation screen 70 etc. The reception screen 74 comprises the job information display 75 and the execute button 76 etc. The job information display 75 carries out the function of informing the job information for identifying the job at the time of occurrence of a multiple feeding. The execute button 76 carries out the function of accepting from the user the instruction to carry out the re-processing operations. When the user presses the execute button 76 in the touch panel, the re-processing operations are executed, and when the cancel button, not shown in the figure, is pressed, the execution of the re-processing operations is cancelled and the display returns to the main screen.

In this manner, since a warning indicating that a multiple feeding has occurred is given out during the execution of a job, it is possible for the user to take the necessary corrective measures based on this warning. In addition, since it is possible to transmit this warning to a predetermined terminal such as a PC 8, it is possible for the user to know about the occurrence of a multiple feeding even from a distant location.

Next, a second preferred embodiment is described below that stores the information for identifying the document 1 at which the multiple feeding occurred in the image processing apparatus 80.

In the second preferred embodiment, the RFID tag 2 attached to the document 1 does not have the area for writing the multiple feeding information or the job information. Instead of this, each RFID tag stores identification information that is unique to it. This identification information carries out the function of distinguishing the document 1 to which the RFID tag 2 has been attached from other documents.

Figure 16:
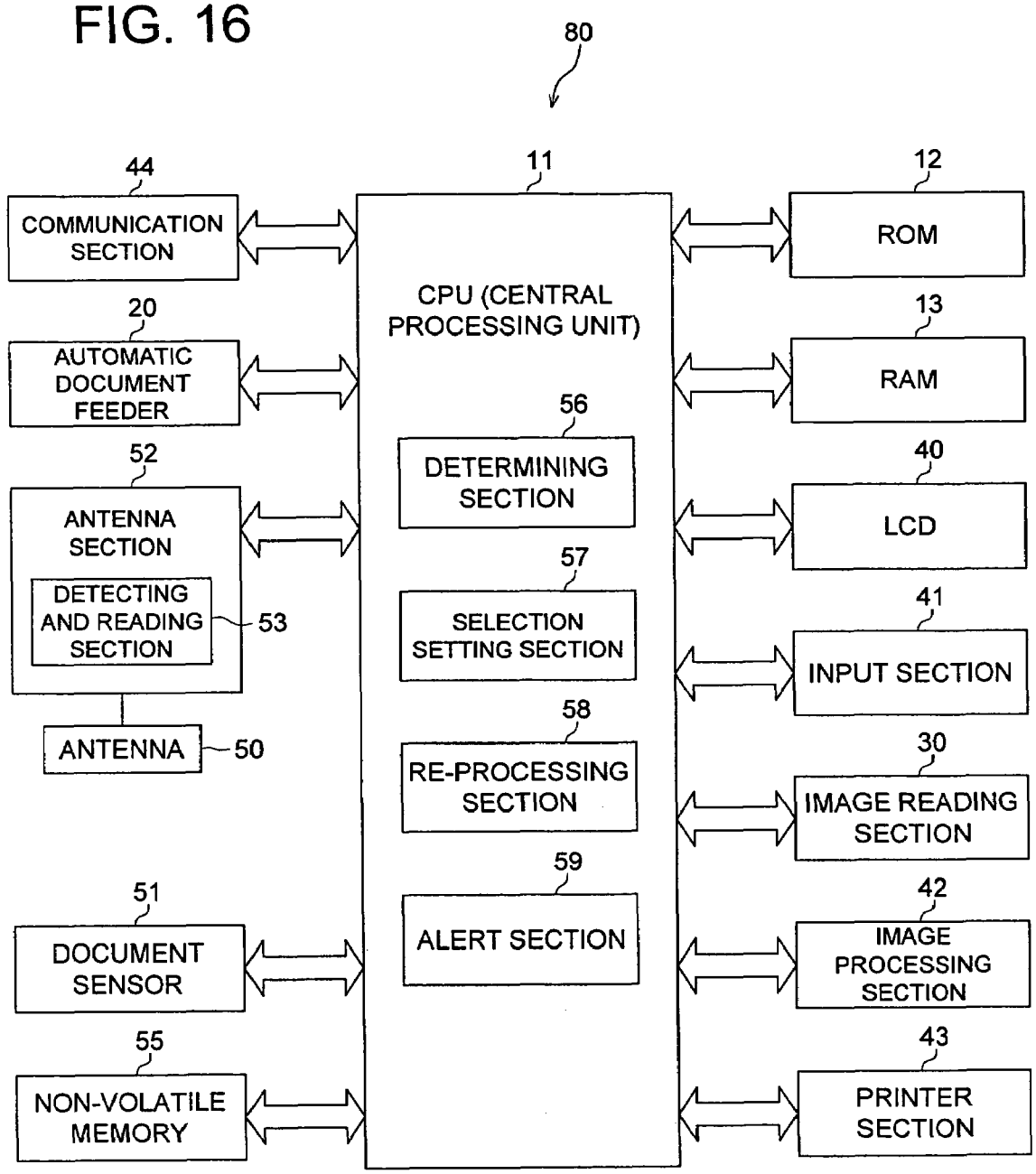
FIG. 16 is a block diagram showing the electrical configuration of an image processing apparatus according to the second preferred embodiment of the present invention.

FIG. 16 shows the electrical configuration of an image processing apparatus 80 according to the second preferred embodiment of the present invention. The basic configuration of the image processing apparatus 80 is similar to that of the image processing apparatus 10 of the first preferred embodiment shown in FIG. 1. Only the points of difference with the first preferred embodiment are described below.

In the second preferred embodiment, there is no area for writing the multiple feeding information or the job information in the RFID tag 2. Therefore, the wireless control section 52 has only the function of a detecting and reading section 53.

The non-volatile memory 55 carries out the function as a storing section that stores the identification information of the document 1 that was fed in an overlapping state while establishing its correspondence with the job information of the job being executed. In addition, it also has the function of storing the image data of sheets of the document 1 that were not fed in an overlapping state while establishing their correspondence with the identification information or the job information.

The determining section 56 has the function of judging whether or not there is some document 1 that has been fed in an overlapping state, based on the methods described in FIG. 5 and FIG. 6. This point is the same as the first preferred embodiment. In addition, when a multiple feeding is judged to have occurred, the determining section 56 has the function of providing the identification information read out from the RFID tag 2 of the documents that were fed in an overlapping state to the non-volatile memory 55, and the function of providing to the non-volatile memory 55 the job information of the job being executed while establishing its correspondence with said identification information.

Figure 17:
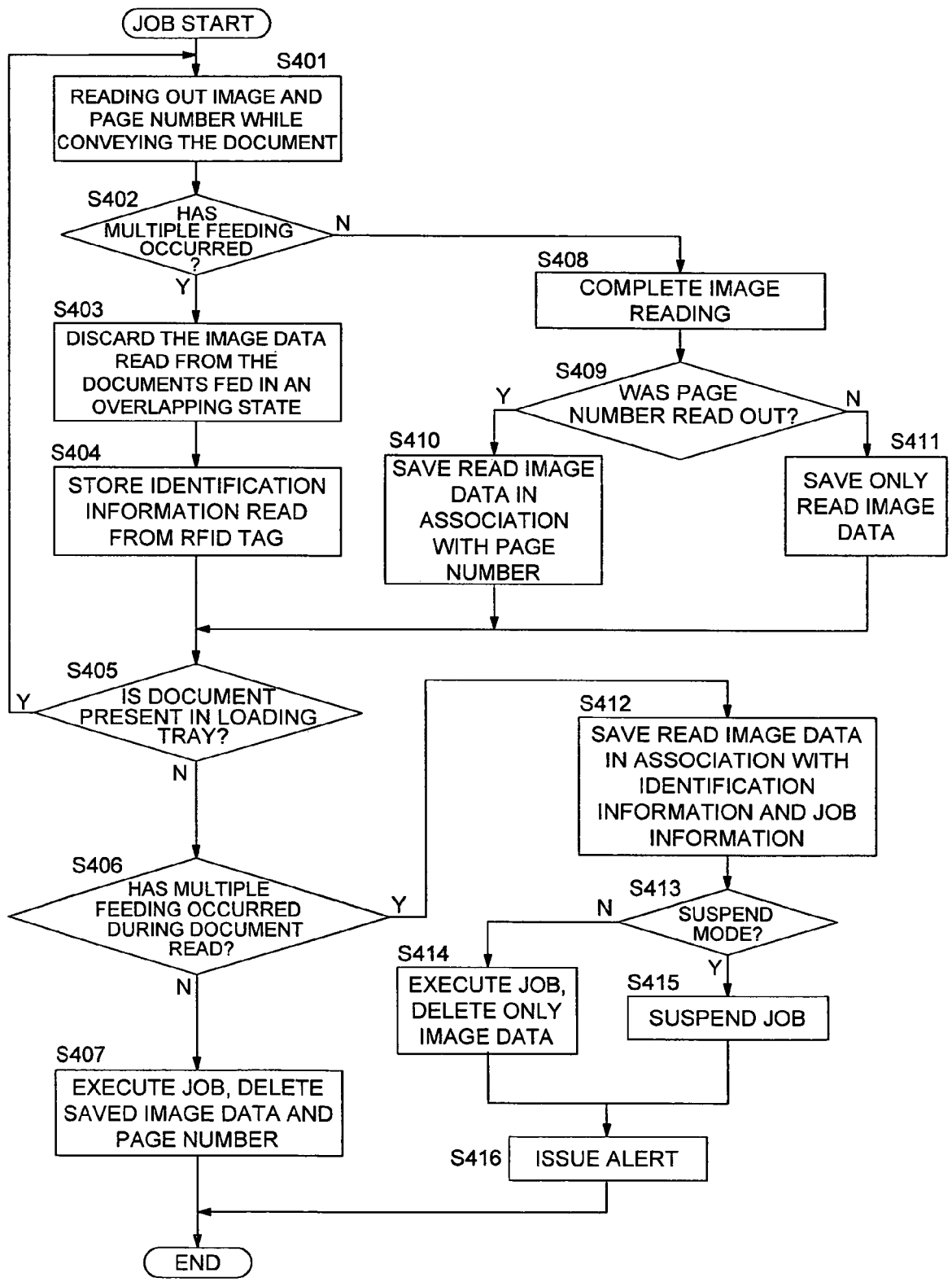
FIG. 17 is a flow diagram showing the flow of operations of judging the occurrence of multiple feeding during the execution of a job by an image processing apparatus according to the second preferred embodiment of the present invention, and of continuing or suspending that job.

FIG. 17 is a flow diagram showing the flow of operations of judging the occurrence of multiple feeding during the execution of a job by the image processing apparatus 80 according to the second preferred embodiment of the present invention, and of continuing or suspending that job. The image processing apparatus 80 reads the identification information. from the RFID tag 2 and takes it as the information for later identifying the document 1 at which the multiple feeding occurred. For example, the operations of the Steps S104-S106 in FIG. 8 have been substituted by the operation shown in Step S404 of FIG. 17. In other words, if a multiple feeding is judged to have occurred (Y in Step S402), the image data of those documents are discarded (Step S403), and the identification information read out from the RFID tags 2 of the documents 1 that were fed in an overlapping state is stored (Step S404).

Further, the image processing apparatus 80 stores this identification information wile establishing correspondence with the image data of the documents that were read out correctly and with the job information of the job being executed (Step S412). If the mode is the forced execution mode (N in Step S413), after executing the job for the images read in correctly, only this image data is deleted (Step S414). Because of this, only the identification information and the job information of the documents 1 that were fed in an overlapping state are stored. Further, if the mode is the suspend mode (Y in Step S413), the job is kept in the suspended state as it is (Step S415).

Figure 18:
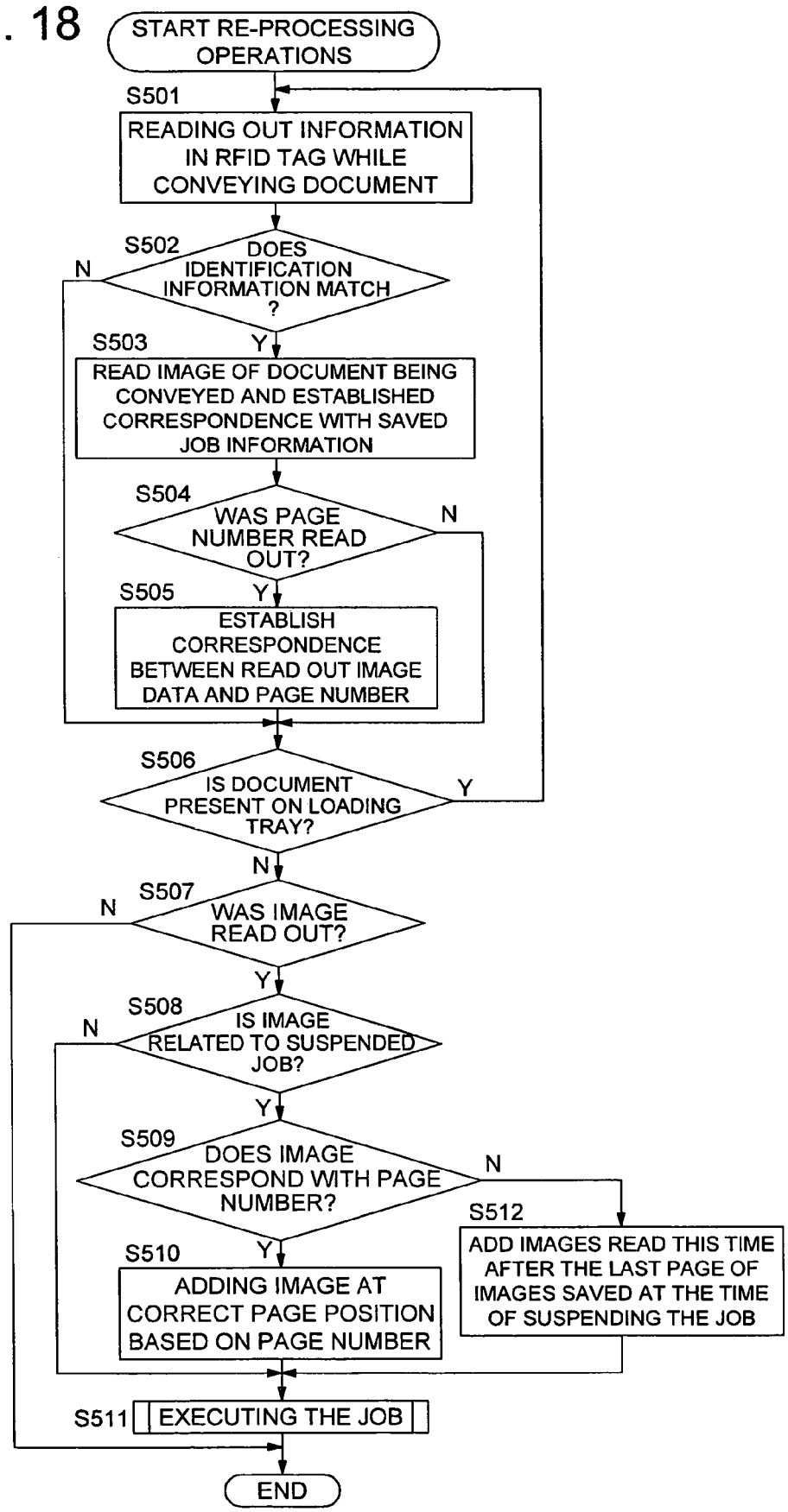
FIG. 18 is a flow diagram showing the flow of reprocessing operations executed by an image processing apparatus according to the second preferred embodiment of the present invention.

FIG. 18 shows the flow of re-processing operations executed by an image processing apparatus 80 according to the second preferred embodiment of the present invention. The image processing apparatus 80, using the identification information stored within the apparatus identifies the documents 1 that have been fed in an overlapping state. For example, the identification information read out from the RFID tags 2 of the documents 1 are compared with the identification information stored within the image processing apparatus 80, and if these match, the document 1 is judged to be one that was fed in an overlapping state and its image is read out (Step S502). Further, the correspondence is established between the read out image and the job information stored within the image processing apparatus 80 (Step S503).

Further, the operations executed in Step S511, is almost identical to the flow of operation shown in FIG. 10. In the forced execution mode, the only difference is that the job corresponding to the image read out during the reprocessing operations is executed based on the job information stored inside the image processing apparatus 80.

In the second preferred embodiment, the identification information identifying the document 1 that was judged to be fed in an overlapping state is read out from the RFID tag 2, and is stored as the information for identifying the document 1 that was judged to be fed in an overlapping state. Because of this, it is not necessary to stop conveying the document at the instant when a multiple feeding has occurred and to keep the image processing apparatus 80 suspended as it was in the state at the time of occurrence of the multiple feeding in order to inform the user of the position of occurrence of the multiple feeding. Further, if the job information is stored while establishing its correspondence with the identification information, it is possible to execute a job with the same contents as those at the time of occurrence of the multiple feeding for the images read out later on without having to make the setting operations again.

Although some preferred embodiments of the present invention have been described above with reference to drawings, the concrete configuration shall not be construed to be limited to these preferred embodiments, and even if there are any alterations or additions within the scope and intent of the present invention, they shall be deemed to be included in the present invention.

For example, the information recording medium attached to the document 1 can also be one of the contacting type such as a magnetic card etc.

Further, although the configurations shown in the preferred embodiments were those in which the multiple feeding information and the job information were separate items of information, it is possible that the job information includes the multiple feeding information. For example, when the job information is read out from the RFID tag 2 during the re-processing operations in the forced execution mode, it is also possible to identify that document 1 as being related to a multiple feeding.

Further, it is also possible that the image processing apparatus is one that does not carry out re-processing operations. For example, when a multiple feeding is judged to have occurred by the determining section 56, it is possible to issue a warning that a multiple feeding has occurred and to request the user himself to execute the job again.

Further, although in the preferred embodiments, all the multiple sheets of documents fed simultaneously were judged to have been fed in an overlapping state, the result of judgment of multiple feeding need not be restricted to this example. For example, the document sheet whose surface is in contact with the contact glass 31 can be judged as a document that has been conveyed in a normal manner, and the second and subsequent sheets of document at the back of that document can be judged as the sheets of document that were conveyed in an overlapping state.

Further, it is also possible to have a configuration in which several jobs related to multiple feeding are managed. In this case, it is good to use job numbers that identify jobs in which a multiple feeding has occurred. Further, if this job number is stored in the RFID tag 2 of the documents which were fed in an overlapping state, or if they are stored in the image processing apparatus 80 while establishing correspondence with the identification information, it is possible to manage separately a plurality of jobs in which multiple feeding has occurred.

Further, the job information written in the RFID tag 2 need not be limited to the type information or the destination information. If the job information related to the number of copies transmitted or the number of copies printed, the resolution, the enlargement or reduction ratio, etc., is written depending on the need, it is possible to execute more detailed operations of the job that was being executed at the time of occurrence of the multiple feeding again without having to make the setting operations.

Further, it is possible not to erase the multiple feeding information or the job information written in the RFID tag 2 at the time of executing the re-processing operations but to make them usable again and again. For example, after the re-processing operations are confirmed to have been completed normally, it is possible to erase these items of information separately by a manual instruction from the user.

Further, the re-processing operations need not be started after waiting for an execute instruction from the user, but the configuration can be such that the re-processing operations are started automatically. For example, an antenna can be installed in the loading tray 21 for reading out the information stored in the RFID tag 2. Next, it is possible to start the re-processing operations automatically when it is recognized that an RFID tag 2 is included in the loaded stack of document sheets that is storing a multiple feeding information or an identification information matching with identification information judged to be related to multiple feeding.

Further, even in the second preferred embodiment, it is possible to configure the image processing apparatus 80 or the RFID tag 2 so that the multiple feeding information or the job information can be written. If the multiple feeding information or the job information is written in the RFID tag 2, it is possible to execute again the job that was executed for the document 1 that was fed in an overlapping state, using some other image processing apparatus 10 that can execute the re-processing operations related to the first preferred embodiment.

Further, it is possible to take measures even when a multiple feeding occurs again for the same document 1 during the re-processing operations. For example, it is possible to issue a new warning judging that the reprocessing operations have failed for the document 1 in which such a situation has occurred.

According to the image processing apparatus of the present invention, since the occurrence of multiple feeding is judged by detecting the information storage media attached to the document sheets, it is possible to carry out judgment of the occurrence of multiple feeding with a high accuracy.

According to another aspect of the preferred embodiment of the present invention, said determining section judges, for any document, the occurrence of multiple feeding based on the result of detection by said detecting section during the period in which the information recording medium attached to that document is scheduled to be detected.

The judgment of the occurrence of multiple feeding is made based on the result of detection of the information recording medium by the detecting section during the period in which the information recording medium of one sheet of document is scheduled to be detected. For example, if the size and orientation of the document is known, taking the instant of time when starting of document feed is detected as the reference, it is possible to recognize the period in which the information recording medium attached to that document is scheduled to be detected by the detecting section using the length of the document and the conveying speed. A multiple feeding is judged to have occurred if the information storage media of two or more sheets of document are detected during such scheduled period.

The scheduled period during which the information recording medium has to be detected is determined absolutely according to the size of the original document sheet. Because of this, even if the size of the document sheets included in the stack of document sheets or the position of attaching the information recording medium to each document sheet is not uniform, it is possible to detect the occurrence of multiple feeding correctly. For example, it is possible to have a configuration in which, taking the instant of time when the front edge of the document being conveyed is detected as the reference, the judgment of the occurrence of multiple feeding is done according to the result of detecting the information storing medium during the above scheduled period that has been stored previously or during the period until the rear edge of the document sheet is detected.

According to another aspect of the preferred embodiment of the present invention, the judgment of the occurrence of multiple feeding is made based on the time lag from the detection of one information recording medium until the detection of the next information recording medium. In other words, when the information recording medium has been attached to the document sheet at a specific position within each document sheet (for example, near the front edge of the document sheet), if one sheet at a time is issued successively, the information storage media will be detected at a constant time interval, but if multiple feeding has occurred information storage media will be detected at a time interval shorter than this constant time interval. Therefore, it is possible to detect the occurrence of multiple feeding from the size of this time interval or from the changes in this time interval.

Since the occurrence of multiple feeding is detected with reference to the time interval of detecting the information storage media, there is no need for a sensor that detects the timing or the absolute position of issuing the document sheets, and hence it is possible to judge the occurrence of multiple feeding.

According to another aspect of the preferred embodiment of the present invention, it is possible to identify the document that was fed in an overlapping state.

According to another aspect of the preferred embodiment of the present invention, the multiple feeding information indicating that that document was fed in an overlapping state is written in the information recording medium of the document that was judged to have been fed in an overlapping state. Since it is possible to identify later on in which document sheet did the multiple feeding occur by reading out the multiple feeding information that had been written, it is not necessary to interrupt the operation of reading the document sheets at the instant of time when the overlapping feed occurred in order to inform the user of the position at which the overlapping feed occurred.

According to another aspect of the preferred embodiment of the present invention, in addition to the multiple feeding information, the job information related to the job during which the multiple feeding occurred is written in the information recording medium of the document that was judged to have been fed in an overlapping state. The job information is the information such as the details of the job that can be useful for executing the same job later on. Using this information, when the document sheet at which multiple feeding occurred is read in again later on, it is possible to execute again for that document sheet a job with the same details as that at the time of occurrence of multiple feeding without carrying out the setting operations.

According to another aspect of the preferred embodiment of the present invention, when the job in which the multiple feeding occurred is a transmission job of transmitting the read out image information, the destination information such as the telephone number or the mail address of the destination to which the image data has to be transmitted is written in as the job information. The destination information can also be a destination name if the actual telephone number or mail address of the destination can be searched from that destination name.

According to another aspect of the preferred embodiment of the present invention, in addition to reading out the image information from the document sheet to which is attached an information recording medium having stored in it the multiple feeding information, a job is executed for the image of that document sheet based on the job information read out from the information recording medium of that document sheet. In other words, from the stack of sheets of the document, the document sheets at which multiple feeding had occurred during the previous image reading are automatically identified and read again, and the job that was not executed for those document sheets previously when multiple feeding had occurred is executed again automatically. Because of this, it is not necessary for the user to carry out manually the work of confirming in which document sheet multiple feeding had occurred previously. Further, since the job is not repeated for the entire stack of document sheets but is executed only for the document sheets at which multiple feeding had occurred previously, this helps in reducing the processing time or in conserving the resources of paper and toner if the job involved print output.

According to another aspect of the preferred embodiment of the present invention, in addition to writing the multiple feeding information for the document sheet at which multiple feeding had occurred, even after the occurrence of multiple feeding, the document reading operations are continued up to the end and completed, the images of normal documents are saved in the image data storing section and that job is completed and its execution is suspended. Thereafter, among the stack of sheets of the document, the document sheets at which multiple feeding had occurred during the previous image reading are automatically identified and read again, the images of these documents that are read again are added to the job under suspension, and this job is executed based on the job information read from the information storage media of the document.

Since the document reading operations are continued up to the end and completed even after the occurrence of multiple feeding, it is possible to release the image processing apparatus for use by other users even if multiple feeding had occurred. Also, since the job is suspended without executing it in an incomplete state of multiple feeding having occurred, and since the job is executed later on after the images of the documents at which multiple feeding had occurred are added to the job, the output operation of the document images such as printing or transmission is executed entirely at one time.

Further, since among the stack of sheets of the document, the document sheets at which multiple feeding had occurred during the previous image reading are automatically identified and read again, it is not necessary for the user to carry out manually the work of confirming in which document sheet multiple feeding had occurred previously. In addition, it is possible to execute again the job with the same contents as that at the time of occurrence of multiple feeding without carrying out the setting operations, and hence the convenience is improved.

According to another aspect of the preferred embodiment of the present invention, the image data read later on is added at a page position based on the page number stored in the information recording medium. Because of this, the job is executed in the same state including the order of pages as that in the case when no multiple feeding has occurred and the reading out of the entire stack of document sheets is completed normally, and there is no cumbersome task of having to rearrange the page order manually.

According to another aspect of the preferred embodiment of the present invention, the identification information for identifying the document sheet at which multiple feeding occurred is read out from the information recording medium attached to that document and is stored in the image processing apparatus side as the information for identifying the document sheet which was judged to be one at which multiple feeding had occurred. Using the stored identification information, since it is possible to identify later on at which document sheet did multiple feeding occur, it is not necessary to stop the document conveying operation at the point at which the multiple feeding occurred in order to inform the user about the position of occurrence of multiple feeding, and also it is not necessary to keep the image processing apparatus suspended in the state at which multiple feeding occurred.

According to another aspect of the preferred embodiment of the present invention, the job information related to the job being executed is stored while establishing correspondence with the identification information for identifying the document sheet judged as one at which multiple feeding has occurred. Using the job information, it is possible to execute the job for the images read in later with the same contents as those at the time of occurrence of multiple feeding without having to make the setting operations again.

According to another aspect of the preferred embodiment of the present invention, when the job in which the multiple feeding occurred is a transmission job of transmitting the read out image information, the destination information is stored as the job information.

According to another aspect of the preferred embodiment of the present invention, because the identification information and job information read out from the information storage media of documents which have been judged as ones at which multiple feeding occurred are stored in the image processing apparatus, and by collating the identification information read out by said information obtaining section from the document being conveyed with the identification information stored in said storing section, a judgment is made as to whether or not the document being conveyed is one at which multiple feeding occurred previously. Further, if it is a document at which multiple feeding occurred previously, in addition to reading in the image data of that document, a job is executed based on the job information stored in the information processing apparatus corresponding to the same identification information as the identification information read out from the information storage media attached to that document.

From the stack of sheets of the document, the document sheets at which multiple feeding had occurred during the previous image reading are automatically identified and read again, and the job that was not executed for those document sheets previously when multiple feeding had occurred is executed again automatically. Because of this, it is not necessary for the user to carry out manually the work of confirming in which document sheet multiple feeding had occurred previously. Further, since the job is not repeated for the entire stack of document sheets but is executed only for the document sheets at which multiple feeding had occurred previously, this helps in reducing the processing time or in conserving the resources of paper and toner if the job involved print output.

According to another aspect of the preferred embodiment of the present invention, for the document sheet for which it was judged that a multiple feeding has occurred, in addition to storing in the image processing apparatus the identification information and the job information read out from the information storage media of that document, even after the occurrence of multiple feeding, the document reading operations are continued up to the end and completed, the images of normal documents are saved and that job is completed and its execution is suspended. Thereafter, among the stack of sheets of the document, the document sheets at which multiple feeding had occurred during the previous image reading are automatically identified and read again based on the collation between the identification information read out from the information recording medium of that document with the identification information stored in the information processing apparatus, the images of these documents that are read again are added to the job under suspension, and this job is executed.

Since the document reading operations are continued up to the end and completed even after the occurrence of multiple feeding, it is possible to release the image processing apparatus for use by other users even if multiple feeding had occurred. Also, since the job is suspended without executing it in an incomplete state of multiple feeding having occurred, and since the job is executed later on after the images of the documents at which multiple feeding had occurred are added to the job, the output operation of the document images such as printing or transmission is executed entirely at one time.

Further, since among the stack of sheets of the document, the document sheets at which multiple feeding had occurred during the previous image reading are automatically identified and read again, it is not necessary for the user to carry out manually the work of confirming in which document sheet multiple feeding had occurred previously. In addition, it is possible to execute again the job with the same contents as that at the time of occurrence of multiple feeding without carrying out the setting operations, and hence the convenience is improved.

According to another aspect of the preferred embodiment of the present invention, the image data read later on is added at a page position based on the page number stored in the information recording medium. Because of this, the job is executed in the same state including the order of pages as that in the case when no multiple feeding has occurred and the reading out of the entire stack of document sheets is completed normally, and there is no cumbersome task of having to rearrange the page order manually.

According to another aspect of the preferred embodiment of the present invention, a warning that a multiple feeding has occurred is given out. Based on this warning, the user can take the necessary corrective measures. The warning can be given not only by displaying in the display panel of the image processing apparatus but also by a warning sound.

According to another aspect of the preferred embodiment of the present invention, the warning that a multiple feeding has occurred is transmitted to a predetermined terminal such as a PC (Personal Computer). The user can know about the occurrence of a multiple feeding even from a remote location.

In an image processing apparatus according to the present invention, since the occurrence of multiple feeding is judged by detecting the information recording medium attached to the document sheets, it is possible to judge the occurrence of multiple feeding with a high accuracy. In addition, using the information recording medium, it is possible to identify later the document sheet at which the multiple feeding occured. As a result, it is not necessary to stop conveying the documents at the instant when a multiple feeding has occurred and to maintain the state at the time of the occurrence of the multiple feeding, it is possible to continue the document reading operations up to the end and to complete them, it is possible to release the image processing apparatus for use by other users.

It is to be noted that various changes and modifications will be apparent to those skilled in the art. Therefore, unless such changed and modifications depart from the scope of the present invention, they should be construed as being included therein.

What is claimed is:
1. An image processing apparatus, comprising:
   an image reading section which reads an image on an original document at a reading position and obtains image data corresponding to the image;
   an original document conveying section which conveys the original document to the reading position by feeding the original document separately from a group of the original documents;
   a detecting section which detects an information recording medium on the original document being conveyed by the original document conveying section;
   a determining section which determines whether multiple feeding, in which a plurality of the original documents are conveyed in an overlapping state, has occurred, based on a detection result of the detecting section, wherein the determining section specifies the original documents which are conveyed in the overlapping state;
   an information obtaining section which obtains identification information stored in the information recording medium on each of the original documents; and
   a storing section which stores the identification information of the original documents specified to have been conveyed in the overlapping state as information for identifying the original documents specified to have been conveyed in the overlapping state.

2. The image forming apparatus of claim 1, wherein the detecting section detects the information recording medium on an arbitrary original document in a predetermined time period when the information recording medium on the arbitrary original document is supposed to be detected, and the determining section determines whether the multiple feeding has occurred based on the detection result of the detecting section.

3. The image forming apparatus of claim 1, wherein the determining section determines whether the multiple feeding has occurred based on a time difference between a time when a first information recording medium on a first original document is detected by the detecting section and a time when a second information recording medium on a second original document is detected by the detecting section.

4. The image forming apparatus of claim 1, further comprising:
   an information recording section which records multiple feeding information, indicating that the document is conveyed in the overlapping state, in the information recording medium on each of the original documents specified to have been conveyed in the overlapping state by the determining section.

5. The image forming apparatus of claim 4, wherein the information recording section further records, in the information recording medium on each of the original documents specified to have been conveyed in the overlapping state, job information of a job for the group of the original documents including the original documents specified to have been conveyed in the overlapping state.

6. The image forming apparatus of claim 5, wherein if the job is a transmission job to transmit the image data of the group of the original documents to a predetermined destination, the information recording section records destination information, which indicates the destination, as the job information in the information recording medium.

7. The image forming apparatus of claim 5, further comprising:
   an information obtaining section which obtains the multiple feeding information and the job information from the information recording media on the original documents being conveyed by the original document conveying section,
   wherein the image reading section obtains image data from the original documents having the information recording media from which the multiple feeding information is obtained, and the job is executed on the image data based on the job information.

8. The image forming apparatus of claim 5, further comprising:

an information obtaining section which obtains the multiple feeding information and the job information from the information recording media on the original documents being conveyed by the original document conveying section; and an image data storing section which stores image data, wherein if the determining section determines that the multiple feeding has occurred, an operation of reading images on the group of the original documents is continued, image data of the original documents conveyed without multiple feeding is stored in the image storing section and the job on the stored image data in the image storing section is suspended, and then after the image reading section obtains image data from the original documents having the information recording media from which the multiple feeding information is obtained by the information obtaining section, the job is executed on the obtained image data from the original documents, which have the information recording media from which the multiple feeding information is obtained, and the image data in the image data storing section based on the job information.

9. The image forming apparatus of claim 8, wherein page number information indicating a page position in the group of the original documents is stored in the respective information recording media on the original documents, the information obtaining section obtains the page number information, and the image data obtained from the original documents having the information recording media from which the multiple feeding information is obtained is inserted in the image data stored in the image data storing section at the page positions in the group of the original documents indicated by the page number information.

10. The image forming apparatus of claim 1, wherein the storing section stores job information of a job for the group of the original documents, which includes the original documents specified to have been conveyed in the overlapping state, in association with the identification information.

11. The image forming apparatus of claim 10, wherein if the job is a transmission job to transmit the image data of the original documents to a predetermined destination, destination information which indicates the destination is stored in the storing section as the job information.

12. The image forming apparatus of claim 10, wherein if identification information obtained from an original document being conveyed by the original document conveying section and the identification information stored in the storing section are the same, the image reading section obtains image data from the original document, and the job is executed on the image data based on the job information which is stored in the storing section in association with the identification information obtained from the original documents specified to have been conveyed in an overlapping state.

13. The image forming apparatus of claim 10, further comprising:

an image data storing section which stores an image data, wherein if the determining section determines that the multiple feeding has occurred, an operation of reading images on the group of the original documents is continued, image data of the original documents conveyed without multiple feeding is stored in the image storing section and the job on the stored image data in the image storing section is suspended, and then if identification information obtained from an original document being conveyed by the original document conveying section and the identification information stored in the storing section are the same, the image reading section obtains image data from the original document, and the job is executed on the obtained image data from the original document and the image data in the image data storing section based on the job information stored in the storing section.

14. The image forming apparatus of claim 13, wherein page number information indicating a page position in the group of the original documents is stored in the respective information recording media on the original documents, the information obtaining section obtains the page number information, and the image data obtained from the original document having the identification information that is the same as the identification information stored in the storage section is inserted in the image data stored in the image data storing section at the page position in the group of the original documents indicated by the page number information.

15. The image forming apparatus of claim 1, further comprising:

an alert section which issues an alert that the multiple feeding has occurred.

16. The image forming apparatus of claim 15, wherein the alert section sends the alert to a predetermined external device.

17. The image forming apparatus of claim 1, wherein the determining section determines that the multiple feeding has occurred if the detecting section detects the information recording media on multiple original documents during a time period in which only the information recording medium on one arbitrary original document should be detected.

* * * * *